(12) United States Patent
Pagliano

(10) Patent No.: US 11,748,828 B1
(45) Date of Patent: Sep. 5, 2023

(54) REAL ESTATE TRANSACTION FACILITATING PROCESS AND INCOMING PROPERTY OFFER NOTIFICATION SYSTEM

(71) Applicant: Jamie Michele Pagliano, Redondo Beach, CA (US)

(72) Inventor: Jamie Michele Pagliano, Redondo Beach, CA (US)

( * ) Notice: Subject to any disclaimer, the term of this patent is extended or adjusted under 35 U.S.C. 154(b) by 163 days.

(21) Appl. No.: 17/066,248

(22) Filed: Oct. 8, 2020

Related U.S. Application Data

(63) Continuation-in-part of application No. 15/864,956, filed on Jan. 8, 2018, now Pat. No. 10,832,357.

(60) Provisional application No. 62/479,164, filed on Mar. 30, 2017.

(51) Int. Cl.
| | |
|---|---|
| G06Q 30/00 | (2023.01) |
| G06Q 50/16 | (2012.01) |
| G06Q 40/04 | (2012.01) |
| G06Q 10/107 | (2023.01) |
| G06Q 30/018 | (2023.01) |
| G06Q 50/18 | (2012.01) |
| G06Q 10/0631 | (2023.01) |
| G06Q 40/03 | (2023.01) |

(52) U.S. Cl.
CPC ..... *G06Q 50/16* (2013.01); *G06Q 10/063114* (2013.01); *G06Q 10/107* (2013.01); *G06Q 30/0185* (2013.01); *G06Q 40/03* (2023.01); *G06Q 40/04* (2013.01); *G06Q 50/188* (2013.01)

(58) Field of Classification Search
None
See application file for complete search history.

(56) References Cited

U.S. PATENT DOCUMENTS

2003/0187756 A1* 10/2003 Klivington ............. G06Q 50/16
715/224

* cited by examiner

*Primary Examiner* — Mila Airapetian
(74) *Attorney, Agent, or Firm* — Plager Schack LLP; Mark H. Plager; Stephen Halberg

(57) ABSTRACT

A real estate transaction facilitating process and system that allows buyers, sellers, and agents to be notified of any incoming offers on a property is disclosed. The real estate transaction facilitating process and system allows buyers, sellers, and agents to see how many offers there are on a property. Sellers have access to all the offers that come in which eliminates a distrustful agent who may hide an offer. Buyers are assured the seller has seen their offer. Agents have all offers in one location so none can be misplaced.

5 Claims, 12 Drawing Sheets

FIG. 14

REAL ESTATE TRANSACTION FACILITATING PROCESS AND INCOMING PROPERTY OFFER NOTIFICATION SYSTEM

CLAIM OF BENEFIT TO PRIOR APPLICATION

This application is a continuation-in-part of and claims benefit to U.S. Non-Provisional patent application Ser. No. 15/864,956, entitled "REAL ESTATE TRANSACTION FACILITATING PROCESS AND INCOMING PROPERTY OFFER NOTIFICATION SYSTEM," filed Jan. 8, 2018. The U.S. Non-Provisional patent application Ser. No. 15/864,956 is incorporated herein by reference.

BACKGROUND

Embodiments of the invention described in this specification relate generally to real estate systems, and more particularly, to a real estate transaction facilitating process and an incoming property offer notification system that allows real estate buyers, sellers, and agents to be notified of any incoming offers on a property.

The real estate industry has a problem with transparency when it comes to buying or selling property. Broadly speaking, there is no transparency in the real estate industry. Listing agents sometimes double end deals and will not show a higher price offer or offer with better terms to guarantee both sides of the transaction for themselves.

Therefore, what is needed is a way to solve the transparency problem within the real estate industry by allowing buyers, sellers and agents to see how many offers there are on a property. Sellers have access to all the offers that come in which eliminates a distrustful agent who may hide an offer. Buyers are assured the seller has seen their offer. Agents have all offers in one location so none can be misplaced.

BRIEF DESCRIPTION

Some embodiments of the invention include a novel real estate transaction facilitating process and a novel incoming property offer notification system that allows real estate buyers, sellers, and agents to be notified of any incoming offers on a property. In some embodiments, the real estate transaction facilitating process includes several steps comprising a step for establishing a website by a property buyer, a property seller, and one or more property agents, a step for setting up a property on the website, a step for determining whether to visually output an offer price for the property contingent upon permission from the property seller, a step for searching for listed properties and saving any property the buyer or an agent wants to watch, a step for sending a text message (SMS) and an email notification when an offer has been submitted on a property of their choice, a step for visually outputting all offers on a portal and instantly notifying a seller when an offer has been submitted, and a step for submitting offers online through the site and being notified that offer file submissions have been uploaded.

In some embodiments, a listing agent sets up the property on the website. In some embodiments, the listing agent requests permission from the property seller to show the offer price. In some embodiments, buyers and agents receive the text message (SMS) and the email notification when an offer has been submitted on a property of their choice. In some embodiments, the real estate seller is an independent real estate seller who is not represented by a real estate agent. In some embodiments, the independent real estate seller has the option of posting their home property for sale by owner on the website.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
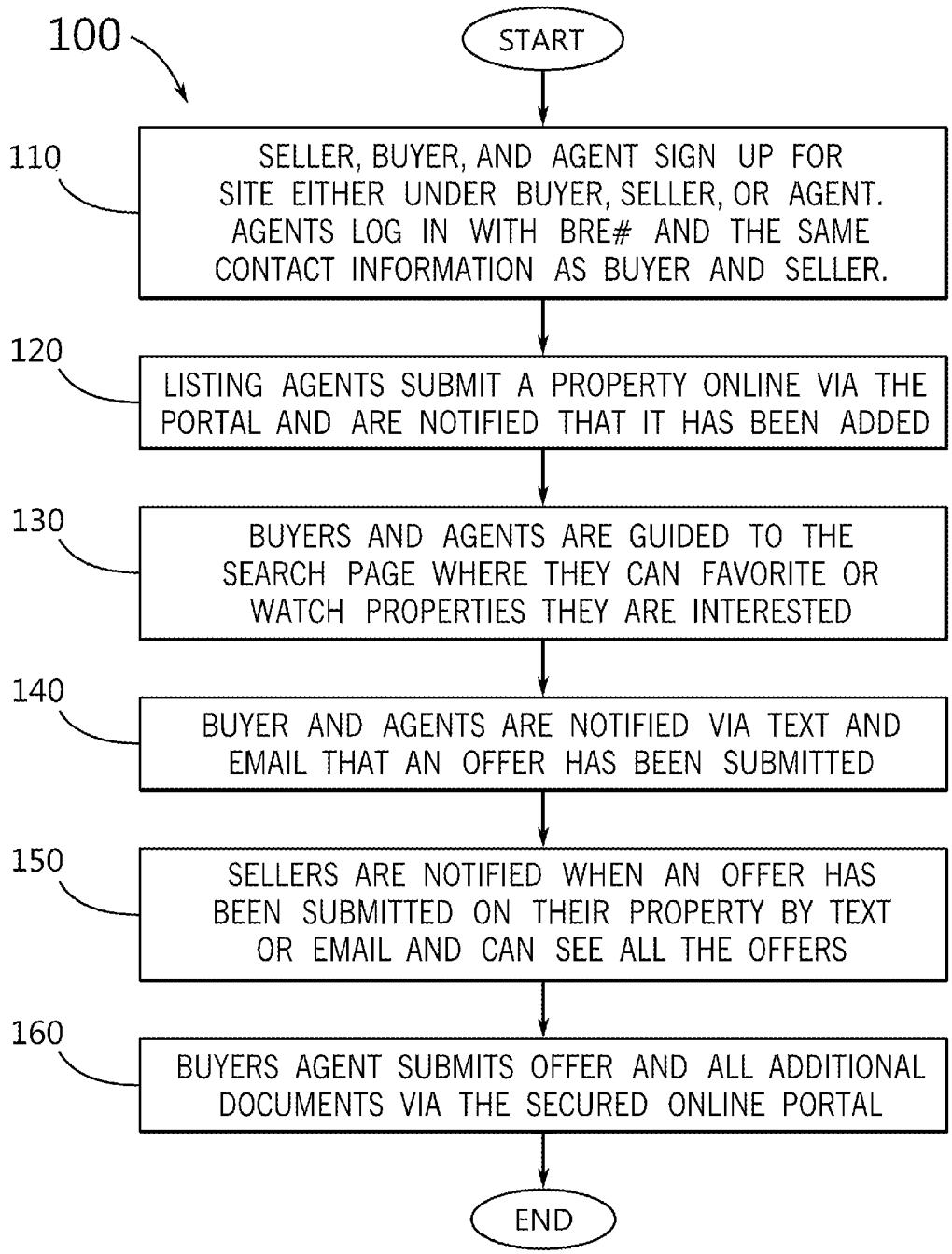

Having thus described the invention in general terms, reference is now made to the accompanying drawings, which are not necessarily drawn to scale, and which show different views of different example embodiments, and wherein:

FIG. 1 conceptually illustrates a real estate transaction facilitating process in some embodiments.

Figure 2:
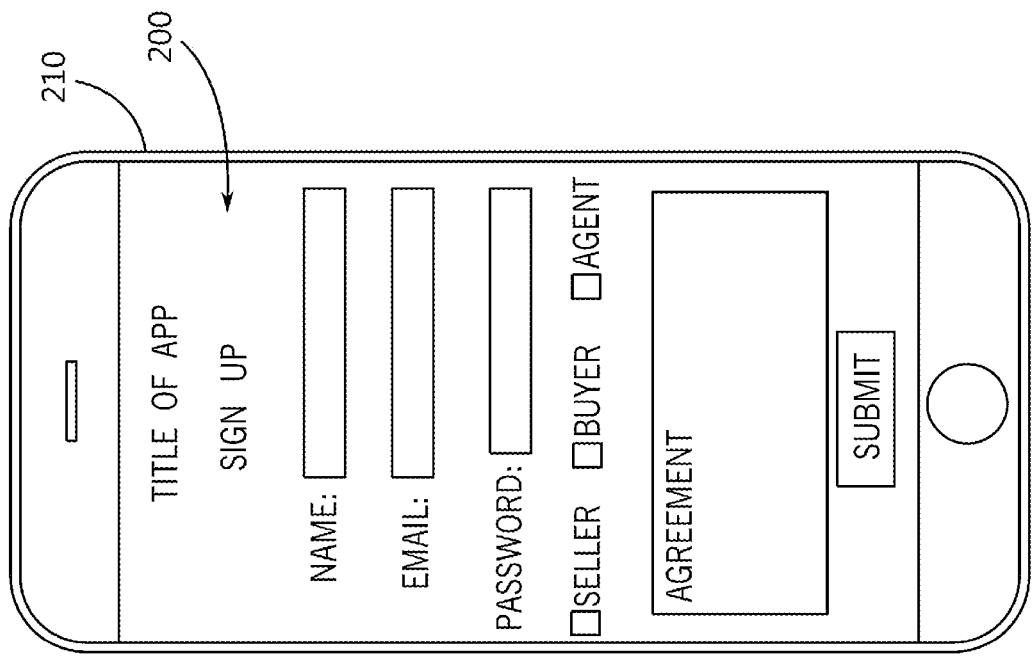

FIG. 2 conceptually illustrates an example of registration view of a graphical user interface (GUI) of a real estate transaction facilitating software application that implements the real estate transaction facilitating process on a digital device in some embodiments.

Figure 3:
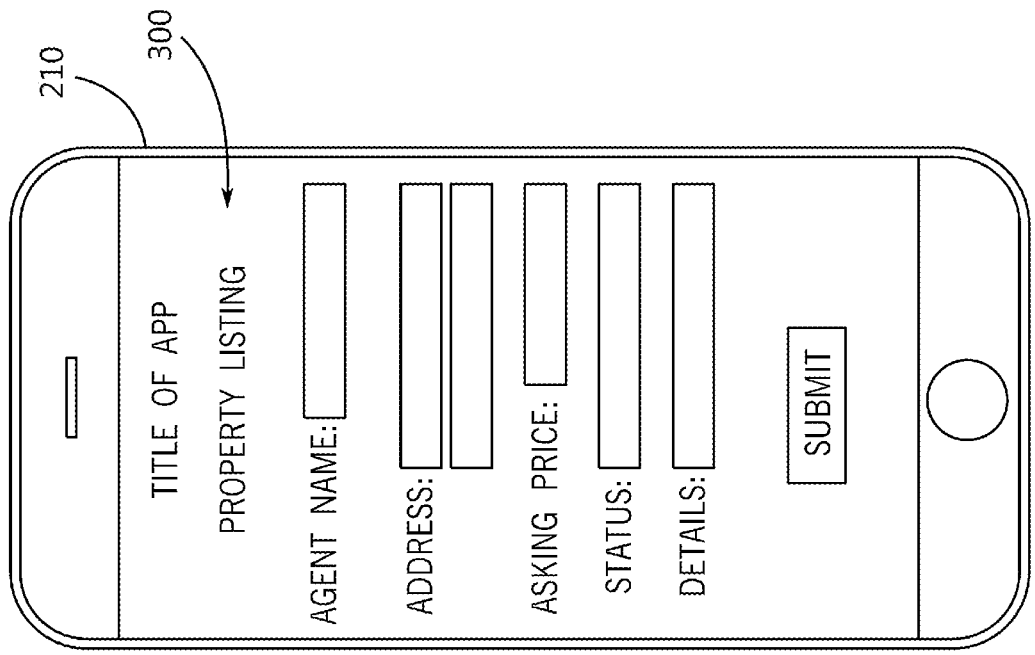

FIG. 3 conceptually illustrates an example of a property listing view of the GUI of the real estate transaction facilitating software application in some embodiments.

Figure 4:
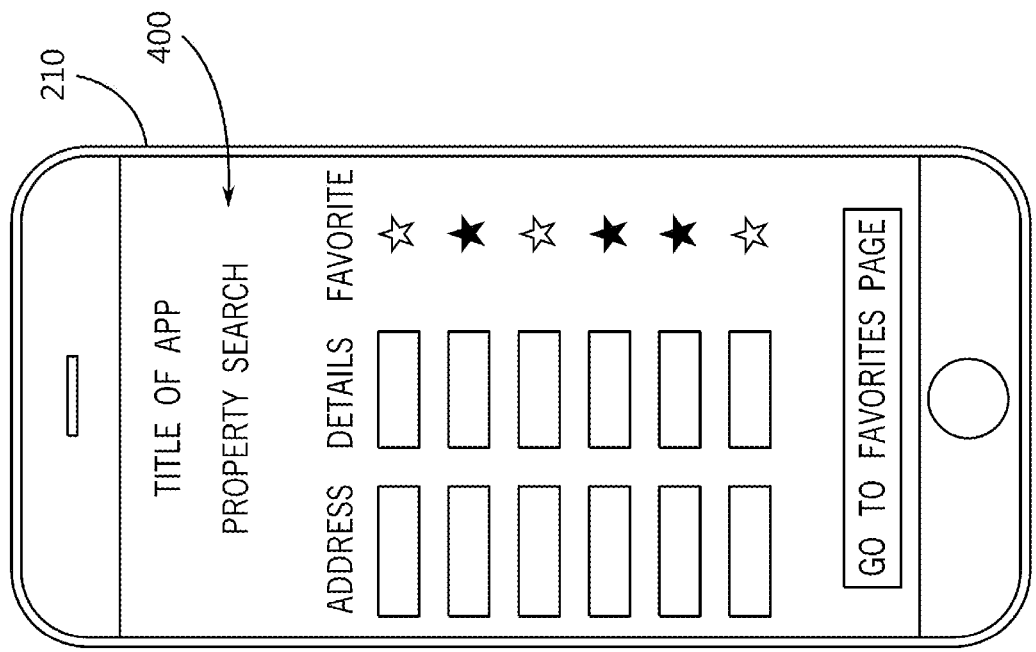

FIG. 4 conceptually illustrates an example of a property search view of the GUI of the real estate transaction facilitating software application in some embodiments.

Figure 5:
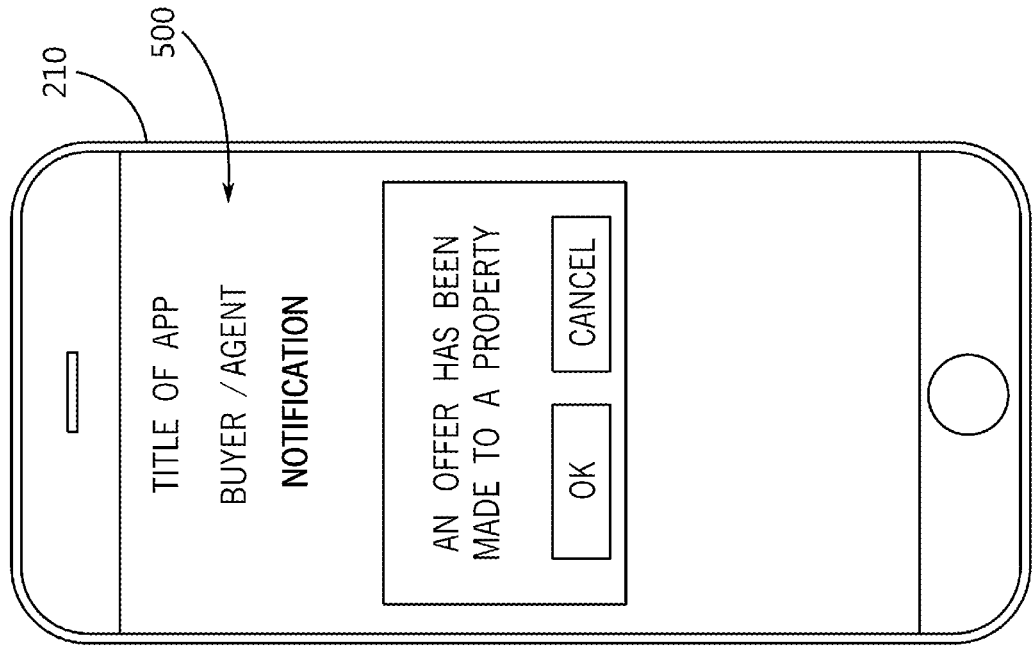

FIG. 5 conceptually illustrates an example of a buyer/agent notification view of the GUI of the real estate transaction facilitating software application in some embodiments.

Figure 6:
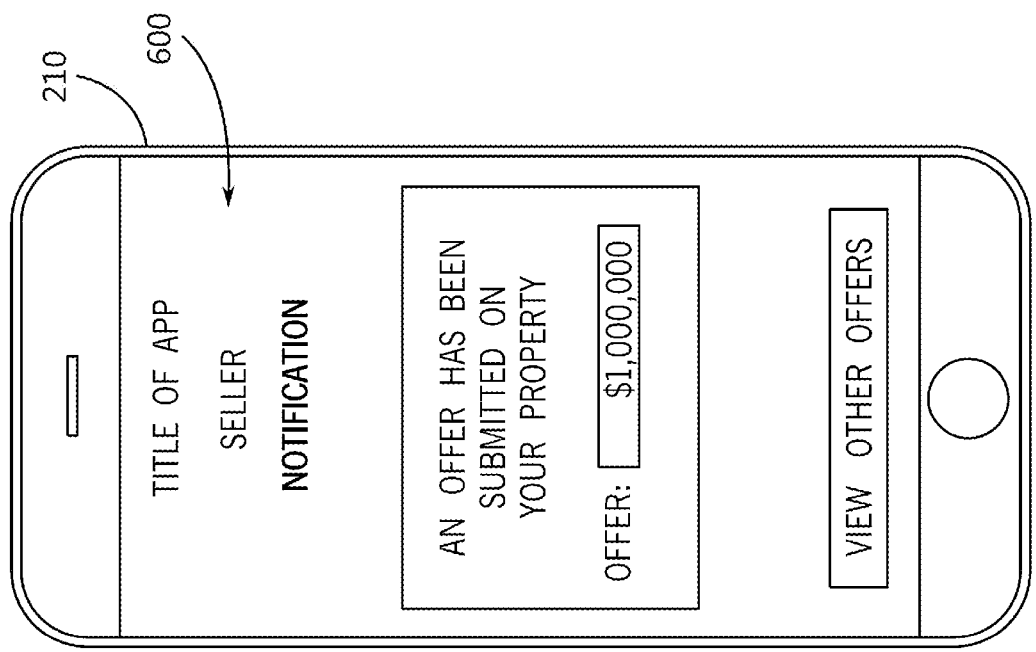

FIG. 6 conceptually illustrates an example of a seller notification view of the GUI of the real estate transaction facilitating software application in some embodiments.

Figure 7:
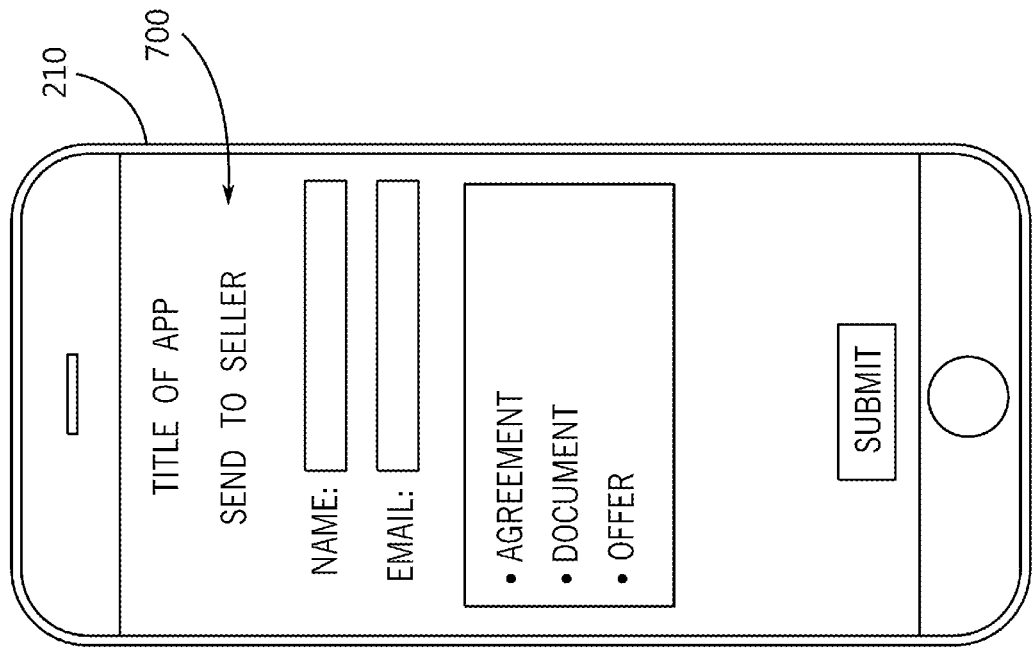

FIG. 7 conceptually illustrates an example of an offer submission view of the GUI of the real estate transaction facilitating software application in some embodiments.

Figure 8:
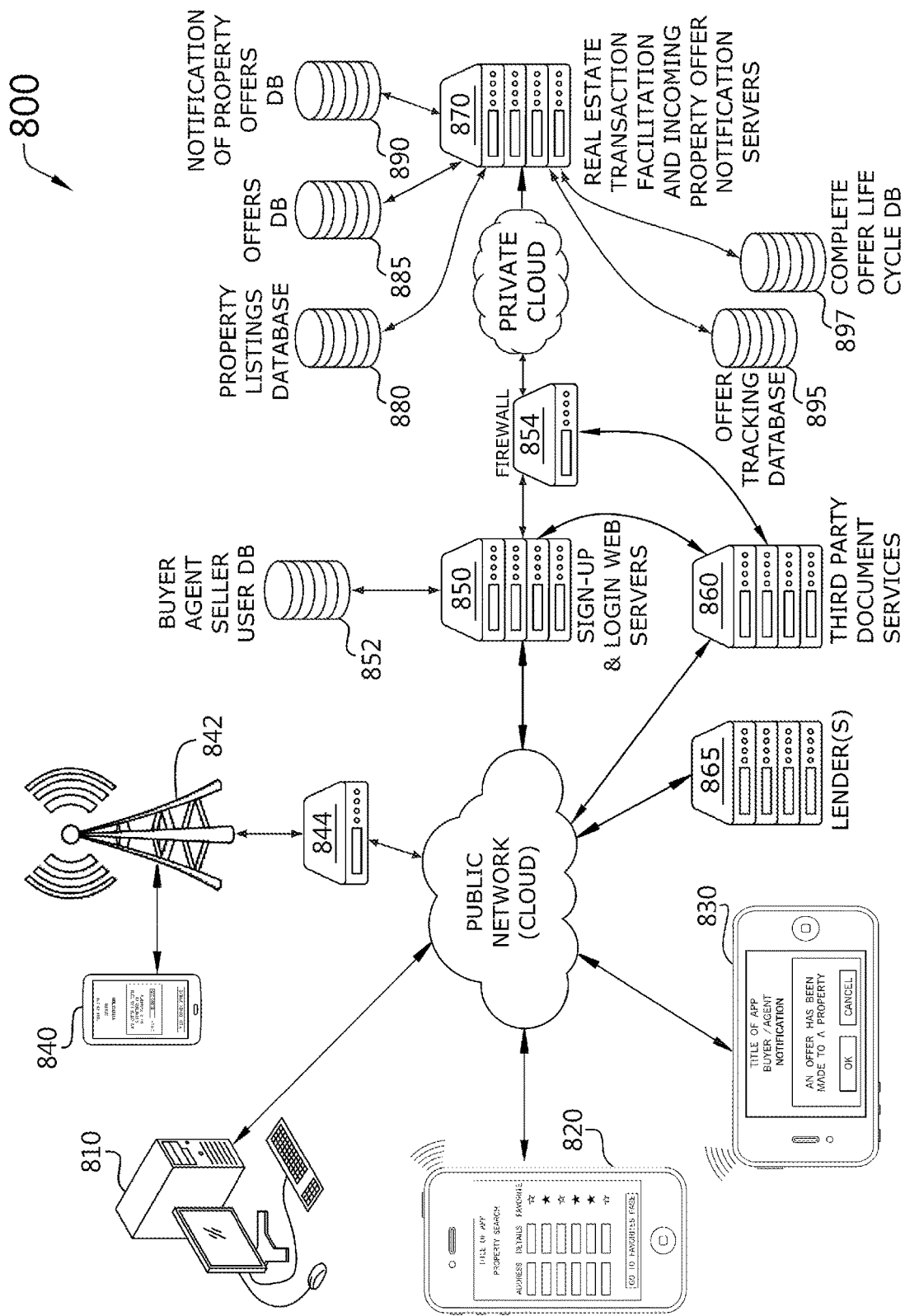

FIG. 8 conceptually illustrates a network architecture of a cloud-based real estate transaction facilitation and incoming property offer notification system in some embodiments.

Figure 9:
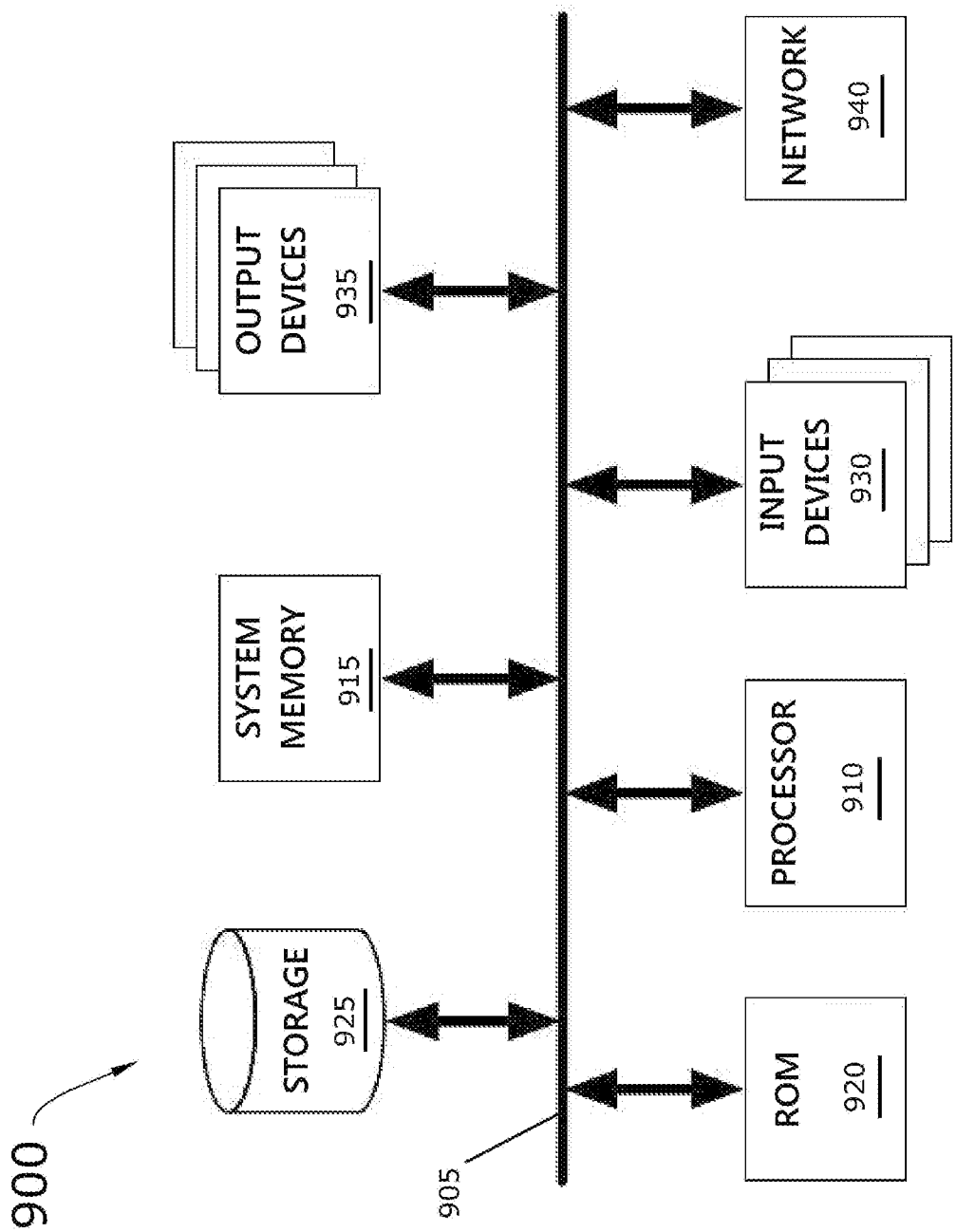

FIG. 9 conceptually illustrates an electronic system with which some embodiments of the invention are implemented.

Figure 10:
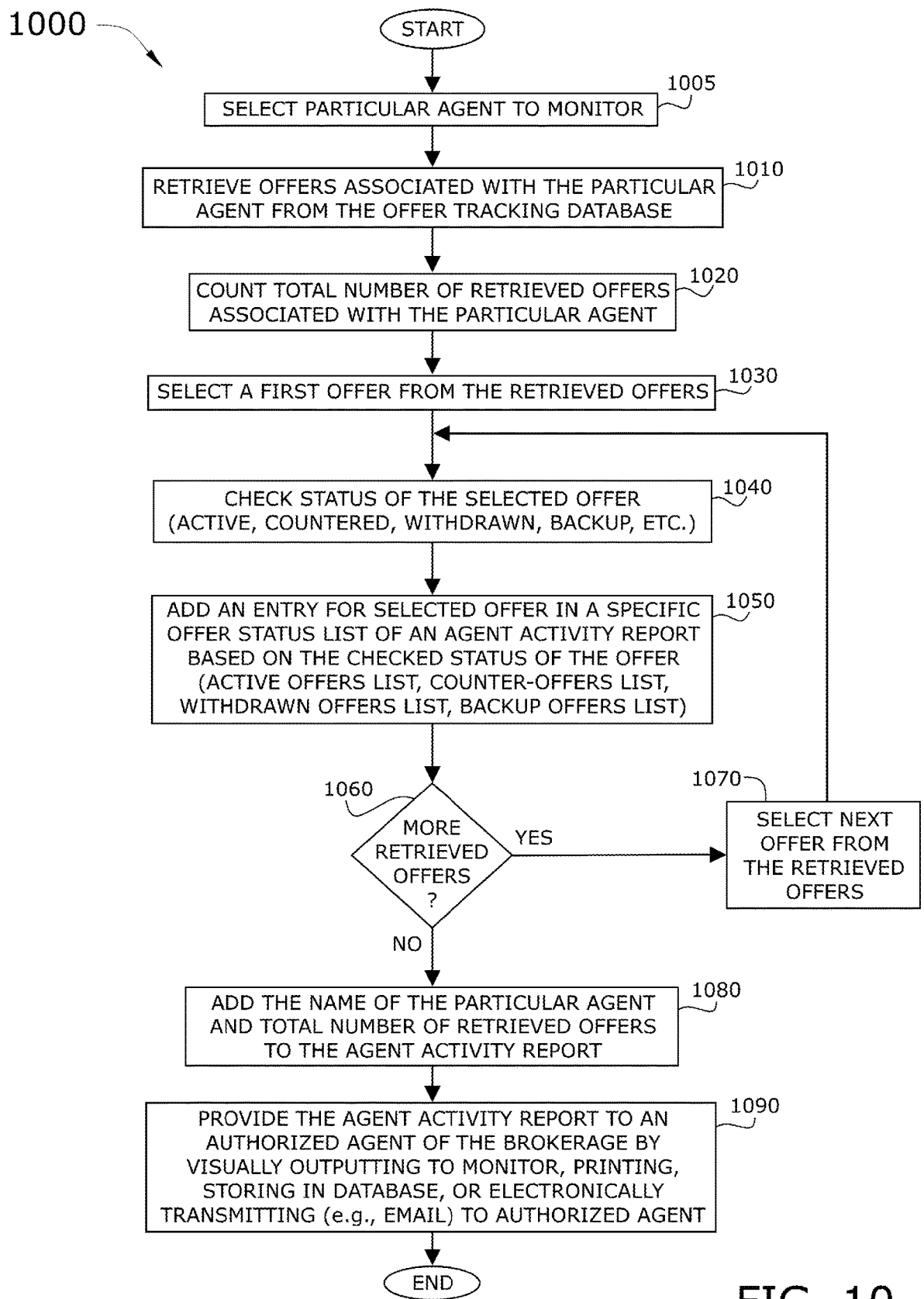

FIG. 10 conceptually illustrates an agent offer quantity and status monitoring process for a brokerage to track offers, offer states, and activities of an agent associated with the brokerage in some embodiments.

Figure 11:
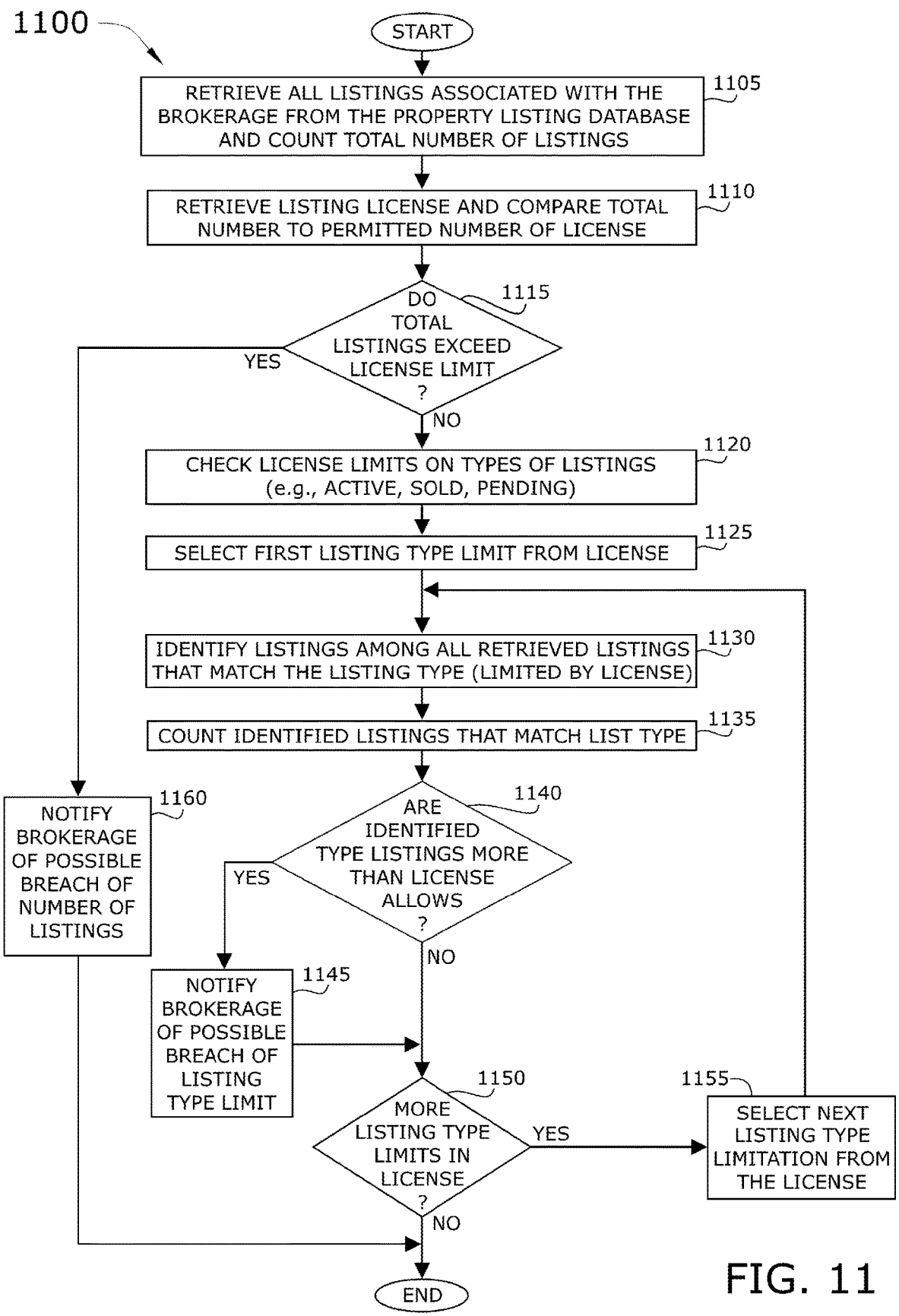

FIG. 11 conceptually illustrates a brokerage property listings license compliance process for tracking property listings associated with the brokerage and determining whether the number and types of property listings of the brokerage complies with the listing license in some embodiments.

Figure 12:
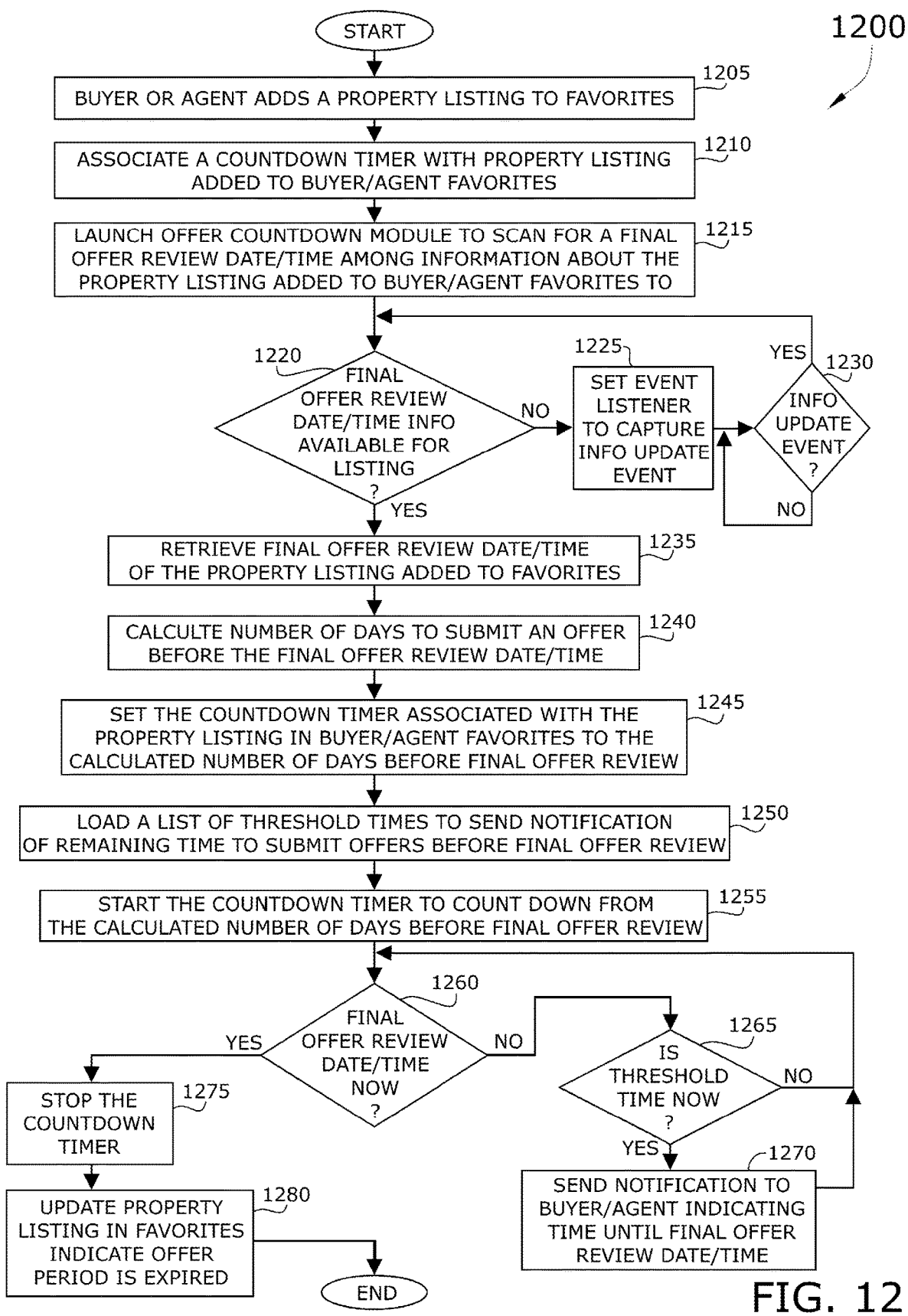

FIG. 12 conceptually illustrates an offer countdown process for sending notifications of remaining time to submit offers until final offer review in some embodiments.

Figure 13:
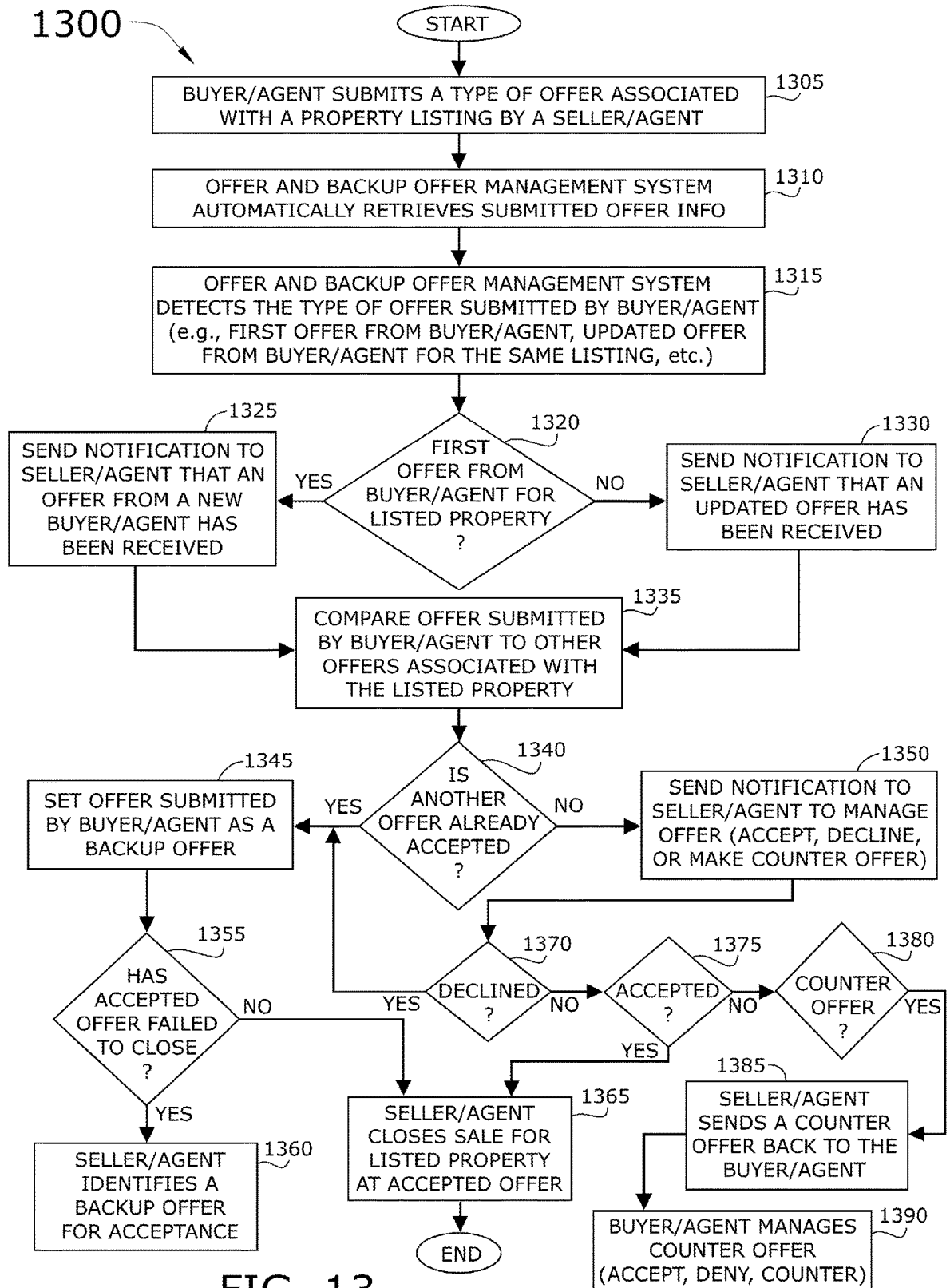

FIG. 13 conceptually illustrates an offer and backup offer management process for converting offers to counter offers, setting offers as backup offers, and managing counter offers to accept, deny, or counter in some embodiments.

Figure 14:
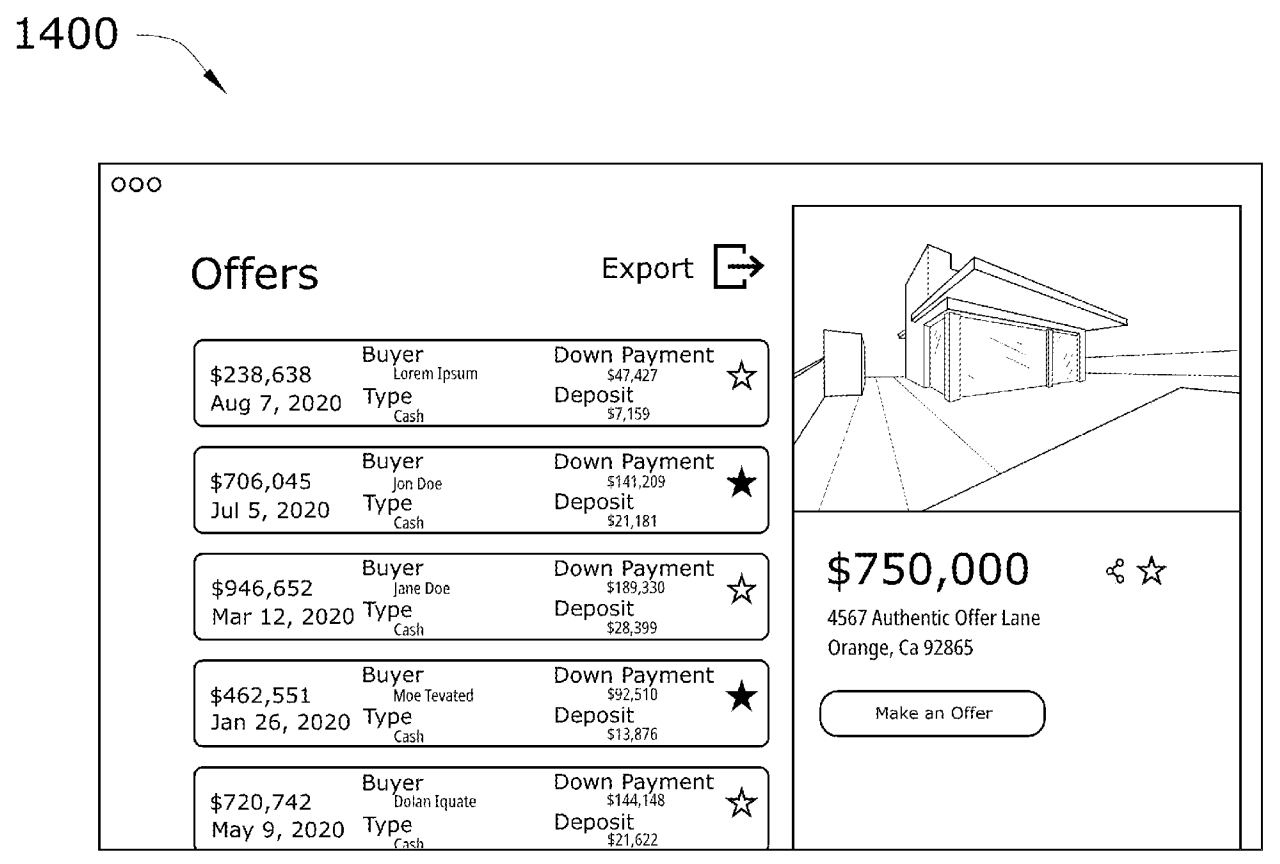

FIG. 14 conceptually illustrates an offers list and user interface (UI) that enables agents and brokerages to view all offers and monitor offer status and activity related to each offer in some embodiments.

Figure 15:
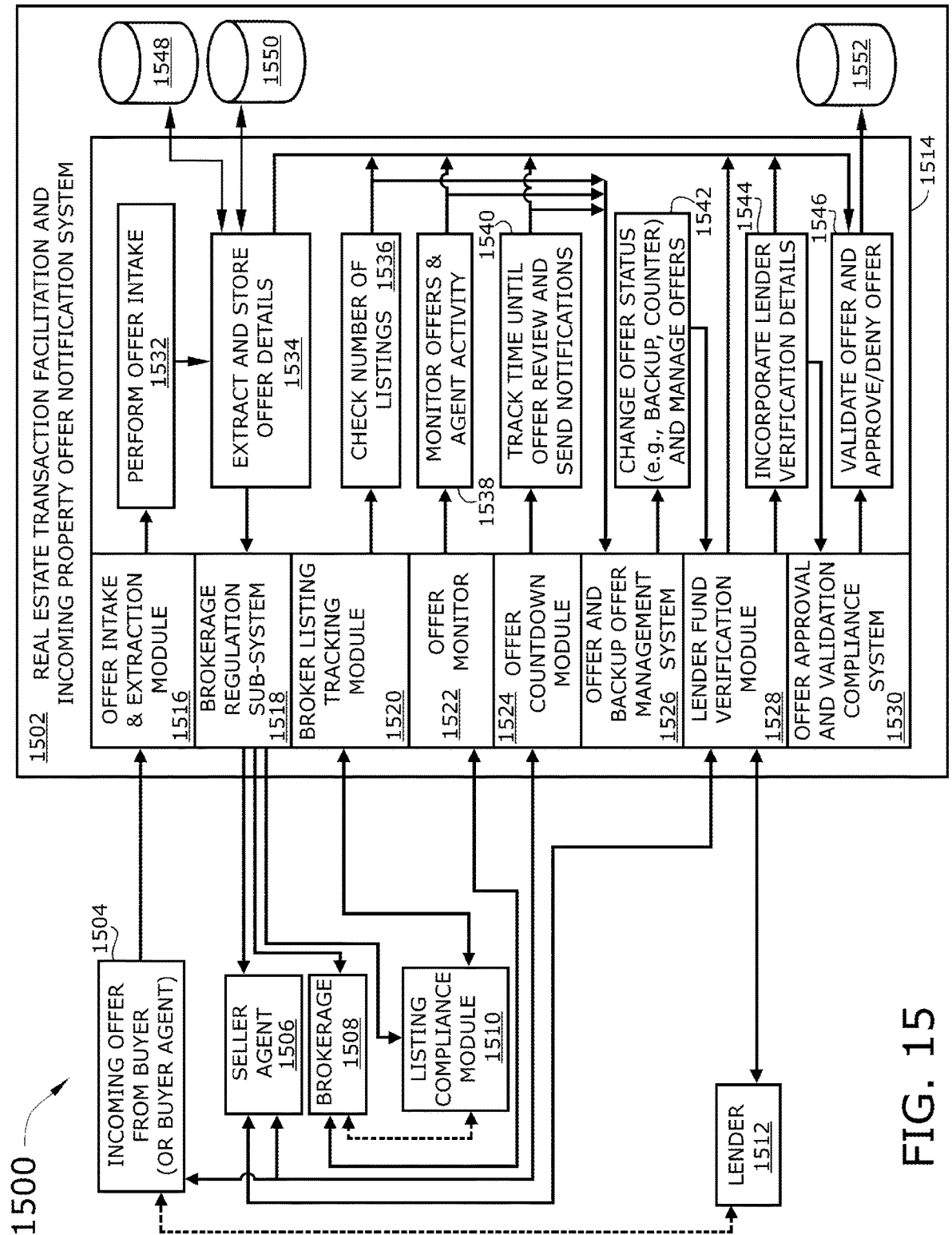

FIG. 15 includes a block diagram that conceptually illustrates a plurality of modules, systems, sub-systems, and monitoring units of a real estate transaction facilitation and incoming property offer notification server in some embodiments.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

As stated above, the real estate industry has a problem with transparency when it comes to buying or selling property. Embodiments of the real estate transaction facilitating process and system described in this specification solves several ongoing problems in the industry, including the problem of agents hiding offers from the sellers, the problem of buyers not knowing if the sellers have seen their offer, the problem of buyers not trusting listing agents, the problem of distrust of listing agents, and the problem of buyers not being able to compete for a property.

Some embodiments of the invention include a novel real estate transaction facilitating process and a novel incoming property offer notification system that allows real estate buyers, sellers, and agents to be notified of any incoming offers on a property. In some embodiments, the real estate transaction facilitating process includes several steps comprising a step for establishing a website by a property buyer, a property seller, and one or more property agents, a step for setting up a property on the website, a step for determining whether to visually output an offer price for the property contingent upon permission from the property seller, a step for searching for listed properties and saving any property the buyer or an agent wants to watch, a step for sending a text message (SMS) and an email notification when an offer has been submitted on a property of their choice, a step for visually outputting all offers on a portal and instantly notifying a seller when an offer has been submitted, and a step for submitting offers online through the site and being notified that offer file submissions have been uploaded.

In some embodiments, a listing agent sets up the property on the website. In some embodiments, the listing agent requests permission from the property seller to show the offer price. In some embodiments, buyers and agents receive the text message (SMS) and the email notification when an offer has been submitted on a property of their choice. In some embodiments, the real estate seller is an independent real estate seller who is not represented by a real estate agent. In some embodiments, the independent real estate seller has the option of posting their home property for sale by owner on the website.

In this specification, there are descriptions of methods and processes that are implemented as software applications or computer programs which run on computing devices to perform the steps of the real estate transaction facilitating method and/or process or the steps of methods and/or processes performed by the incoming property offer notification system. However, it should be noted that for the purposes of the embodiments described in this specification, the word "method" is used interchangeably with the word "process". Real estate transaction facilitating processes or methods are described, therefore, by reference to example methods that conceptually illustrate steps of real estate transaction facilitating processes and steps of processes or methods performed by the incoming property offer notification system are described by reference to example systems that conceptually illustrate components of the systems which carry out one or more steps of methods or processes performed in relation to the incoming property offer notification system.

Embodiments of the real estate transaction facilitating process and system described in this specification differ from and improve upon currently existing options. In particular, some embodiments provide an improvement in the real estate industry because it allows for easy presenting since all offers are in one convenient location. Sellers and buyers are assured their offers are shown and seen. In addition, these embodiments improve upon the currently existing options in the real estate industry because it allows for easy presenting since all offers are in one convenient location. Sellers and buyers are assured their offers are shown and seen. This vastly improves transparency over the existing state of the industry, in which unethical agents are not doing their sellers justice by hiding offers. In the end, the seller may potentially receive less money for their home with the most qualified buyer missing out on the property and that buyer's agent missing out on their commission.

In contrast, the real estate transaction facilitating process and system of the present disclosure improves upon the existing options in the real estate industry by allowing buyers, sellers, and agents to see how many offers there are on a property. Sellers have access to all the offers that come in which eliminates a distrustful agent who may hid an offer. Buyers are assured the seller has seen their offer. Agents have all offers in one location so none can be misplaced.

The real estate transaction facilitating process and system of the present disclosure may be comprised of the following steps and elements. This list of possible constituent steps and elements is intended to be exemplary only and it is not intended that this list be used to limit the real estate transaction facilitating process and system of the present application to just these steps and elements. Persons having ordinary skill in the art relevant to the present disclosure may understand there to be equivalent steps and elements that may be substituted within the present disclosure without changing the essential function or operation of the real estate transaction facilitating process and system.

1. Buyer, seller, and agents sign up for website.

2. Listing agent sets up property on website and gets seller's permission to show the offer prices (or to hide the offer price).

3. Buyers and agents search and save properties they want to watch.

4. Buyers and agents get sent text and email notification(s) when an offer has been submitted on a property of their choice.

5. Sellers login and can see all the offers on their portal and get notified instantly when an offer has been submitted.

6. Buyer agents submit offers online through the site and are notified that their files have been uploaded.

By way of example, FIG. 1 conceptually illustrates a real estate transaction facilitating process 100. The real estate transaction facilitating process 100 may be implemented and performed by a real estate transaction facilitating software application. The real estate transaction facilitating software application may run on a server computing device to which other computing devices connect in order to interact with the real estate transaction facilitating software application. For example, the real estate transaction facilitating software application may run on a network-based cloud server to which mobile computing devices of buyers, agents, and sellers connect to facilitate real estate transactions. In this description, the steps of the real estate transaction facilitating process 100 are described by reference to FIGS. 2-7, which illustrate several graphical user interface (GUI) views that a visually output to display screens of mobile devices that allow buyers, agents, and sellers to interact over a network with the real estate transaction facilitating software application.

In some embodiments, the real estate transaction facilitating process 100 starts with sign up (at 110). Signing up (or registering) is a first step when a seller, an agent, and/or a buyer is not already signed up or registered. In some embodiments, each of the seller, the buyer, and the agent sign up (register) under a profile associated with the buyer, the seller, and/or the agent. Basic information is requested at sign up. Examples of information requested at sign up include, without limitation, a name, an email address, a password, a real estate transaction role designation, and a note field. The real estate transaction role designation can be a selection of seller, buyer, or agent. In some embodiments, agents can log in with an existing profile that is associated with a unique agent identifier. For example, agents can log in with a BRE # and the same contact information as buyer and seller.

An example of sign up is described by reference to FIG. 2, which conceptually illustrates an example registration view 200 of a GUI visually output on a display screen of a mobile device 210 to allow interaction with the real estate transaction facilitating software application running on the server computing device. As shown in this figure, the registration view 200 of the GUI includes fields for a user to input a name, an email address, and a password. The registration view 200 of the GUI also includes check boxes for the user to make a selection of a real estate transaction role, namely, a seller, a buyer, or an agent. A note field allows the user to input open-ended information related to ongoing the real estate transaction. To complete sign up, the user selects the "submit" button after inputting the requested sign up information. Submission is accepted when the requested sign up information is complete and correct. The sign up information is not correct when the input field expects input of a specific form or type, but the user-provided information does not satisfy the specific form or type. For example, the user tries to enter an email address without an "@" character, or the user leaves the name field empty or does not select a real estate transaction role. In some embodiments, the note field may be left empty, and is an optional field not required to be completed for acceptable submission of the sign up information. When the "submit" button is selected by the user, the information provided in the fields is checked for completeness and correctness. Submission is rejected when the requested sign up information is not completed correctly or is incomplete. The user can re-enter sign up information when the submission is rejected.

Turning back to FIG. 1, the real estate transaction facilitating process 100 of some embodiments proceeds to the next step at which listing agents submit a property online (at 120) and are notified when the submitted property has been added. To submit a property online, the user (e.g., an agent user) provides information including, without limitation, a name of the agent, an address of the property, an asking price of the property, a status of the property, and details about the property. In some embodiments, the information provided by the user need not be complete. For example, the user may input the agent name, the address of the property, and the status of the property, but may refrain from inputting an asking price or details about the property.

An example of property listing submission is described by reference to FIG. 3, which conceptually illustrates an example of a property listing view 300 of the GUI that is visually output on the display screen of the mobile device 210 of the user to allow a property to be submitted for listing at a portal of the real estate transaction facilitating software application running on the server computing device. As shown in this figure, the property listing view 300 of the GUI includes fields for the agent name, the property address, the asking price for the property, the status of the property, and details about the property. When the agent user has input information about the property to be listed, then the agent user may select the "submit" button to have the property posted and listed on the portal. Once submitted, the property can be found during a search of properties.

In reference to FIG. 1, the real estate transaction facilitating process 100 moves on to the next step at which buyers and agents are guided to the search page (at 130). Once at the search page, the buyer or the agent can select properties as favorites to be listed in private filtered list of favorite properties, or may simply review information pertaining to one or more properties they find interesting or worth keeping an eye on. At the search page, the user would also be able to search for and find any property submitted by way of the property listing view 300 of the GUI.

By way of example, FIG. 4 conceptually illustrates an example of a property search view 400 of the GUI that is visually output on the display screen of the mobile device 210 of the user to provide searching capabilities for the user to find listed properties. As shown in this figure, the property search view 400 of the GUI includes information fields of properties found during a property search, including, without limitation, an address for each listed property, details of each listed property, and a favorites designation. The property search view 400 of the GUI also includes a "Go To Favorites Page" button which, when selected by the user, navigates to a view of the favorites of the user. From the property search view 400 of the GUI, any one of the listed properties can be selected by the user. For example, the user may provide a touch input of the address information related to a particular listed property to see further details of the selected property. The user may also add properties to the user's own favorites by selection of the star adjacent to the corresponding listed property. Similarly, a selection of the star adjacent to a listed property which is already in the user's favorites will cause the property to be removed from the user's favorites list. As a person skilled in the art would appreciate, the GUI tools and fields shown in this example can take other forms. For example, the selectable star adjacent to each listed property can take a different form or shape, including a check box to designate the property as either a favorite or not, a selectable button to add the property to the favorites list, a selectable fill-in circle, etc.

Now turning back to FIG. 1, in some embodiments, the real estate transaction facilitating process 100 transitions to the next step at which the buyer and the agent(s) are notified (at 140) that an offer has been submitted in relation to a property which the buyer and/or the agent(s) have designated to watch (e.g., by adding the property to the buyer's list of favorites). In some embodiments, the buyer/agent notification is transmitted to the buyer and/or agent(s) via text message (SMS). In some embodiments, the buyer/agent notification is transmitted to the buyer and/or agent(s) via email. In some embodiments, the buyer/agent notification is transmitted to the buyer and/or agent(s) via mobile app, which when opened by the buyer and/or agent(s) is presented visually on the display screen of the device.

A typical buyer/agent notification is demonstrated and described next, by reference to FIG. 5. Specifically, FIG. 5 conceptually illustrates a buyer/agent notification 500 that is transmitted to and received by the buyer and/or the agent when an offer is submitted in relation to a particular listed property of interest to the buyer (and the agent). For example, the buyer may have searched for listed properties and added a particular listed property to the buyer's favorites list. When another party makes an offer in relation to the particular listed property, the buyer (and agent) are automatically notified as a result of the particular property being designated as a favorite of the buyer. As shown in this figure, the buyer/agent notification 500 is visually output on the display screen of the mobile device 210 used by either the buyer or the agent. As a person skilled in the art would appreciate, when the real estate transaction involves a buyer and one or more agents, each party (i.e., the buyer and each agent) would receive the same buyer/agent notification on their respective computing device, so long as the buyer has designated the property a favorite and is associated with the agent(s) in relation to the property. The buyer/agent notification 500 itself includes basic information that merely indicates that an offer has been submitted for a listed property which the buyer is in some way interested.

Turning back to FIG. 1, the real estate transaction facilitating process 100 of some embodiments continues forward to the next step at which a seller of a property is notified (at 150) when an offer has been submitted in relation to their property. In addition to being able to see the newly submitted offer for the property, the seller can view all offers on the property, in order to compare the newly submitted offer with any prior and/or pending offers related to the property. In some embodiments, the seller notification is transmitted to the seller via text message (SMS). In some embodiments, the seller notification is transmitted to the seller via email. In some embodiments, the seller notification is transmitted to the seller via mobile app, which when opened by the seller is presented visually on the display screen of the seller's computing device or mobile device.

A typical seller notification is demonstrated and described next, by reference to FIG. 6. Specifically, FIG. 6 conceptually illustrates an example of a seller notification 600 that is transmitted to and received at the mobile device 210 used by the seller when an offer has been submitted for a property associated with and listed by the seller. As shown in this example, the seller notification 600 includes basic information about the offer, including an offer price. The seller notification 600 also includes a button to "View Other Offers" which, when selected by the seller, navigates to a view that includes a list of all offers made in relation to the property, along with the offer price submitted with each offer. In this way, the seller is quickly informed of new offers on the property, and is able to efficiently compare all offers for the property by selection of the "View Other Offers" button.

Referring back to FIG. 1, in some embodiments, the real estate transaction facilitating process 100 transitions to a step at which an agent of a buyer submits an offer (at 160) in relation to a listed property. In some embodiments, the buyer provides some basic information in connection with the offer. Such basic information includes, without limitation, a name of the buyer or buyer's agent, a mobile number of the buyer or the buyer's agent, and/or an email address of the buyer of the buyer's agent. In addition to the basic information, in some embodiments, the buyer provides additional documents in connection with the offer. The additional documents may be suggested, recommended, or required. The additional documents in connection with the offer for the property include, without limitation, a formalized agreement, a written offer amount, a document related to financing or ability to pay the offer price by the buyer, among any of several other documents which may be connected to a real estate transaction for the property. A notification is transmitted to the seller when buyer makes the offer. Specifically, since the listed property is associated with a particular seller, it is the listed seller (or an agent of the seller) who is notified upon submission of the offer by the buyer and/or the buyer's agent (as described above at step 150). Therefore, as a person skilled in the art would appreciate, several of the steps of the real estate transaction facilitating process 100 may occur in a sequence that is alternative to the sequence of steps illustrated in FIG. 1, but the results of the real estate transaction facilitating process 100 will be the same.

A typical property offer is demonstrated and described next, by reference to FIG. 7. Specifically, FIG. 7 conceptually illustrates an example of a property offer submission view 700 of the GUI that is visually output on the display screen of the mobile device 210 of the buyer or an agent of the buyer. The property offer submission view 700 allows a buyer to make an offer for a listed property and to transmit the offer to the seller with additional required or suggested documents in support of the real estate transaction for the property. As shown in this figure, the property offer submission view 700 includes a name field for the name of the buyer or the name of the buyer's agent, an email field for the email address of the buyer or the email address of the buyer's agent, and a listing of documents required, recommended, or suggested to accompany the property offer submission. In this example, the list of documents includes an agreement (a formalized agreement), a document (a particular document with pertinent information), and a formalized offer statement. However, in some cases, there are no required, recommended, or suggested documents listed (even when formalized documents may later be required in support of an offer being submitted). Also, the property offer submission view 700 includes a "Submit" button which is selectable by the user (buyer or buyer's agent) to submit the offer to the associated seller of the property.

Turning back now to FIG. 1, in some embodiments, after completing some or all of the aforementioned steps, the real estate transaction facilitating process 100 ends. However, in some other embodiments, the real estate transaction facilitating process 100 is active on a continuous basis and is driven by user interactions related to one or more operations including signing up, listing properties, searching for properties, and making and receiving offers for properties.

The real estate transaction facilitating process and system of the present disclosure generally works by a website that runs a cloud service software application that implements the real estate transaction facilitating process. In some embodiments, the website is hosted by a cloud-network based web server computing device and is accessible to client computing devices that connect over the Internet. The cloud service software application may be implemented by encoding the steps of the process in a manner that a processing unit of the web server computing device can complete the operations as selected and directed according to a client computing device user's interaction with the cloud service. When the steps of the process are properly encoded, the user can navigate and interact to their desired end result. In some embodiments, the user follows the steps to guide the user through the online process to complete what they want to achieve.

By way of example, FIG. 8 conceptually illustrates a network architecture of a cloud-based real estate transaction facilitation and incoming property offer notification system 800. As shown in this figure, the cloud-based real estate transaction facilitation and incoming property offer notification system 800 includes several client-side computing devices, including a desktop computer 810, a first mobile computing device 820, a second mobile computing device 830, and a tablet computing device 840. The cloud-based real estate transaction facilitation and incoming property offer notification system 800 also includes a wireless communication point 842 (e.g., a cell tower for cellular data communication), a gateway 844, a set of front end cloud server computing devices 850 (for sign up and login by users of the client-side computing devices when connected to the web portal), a user database 852 (storing hash encrypted user profile data, user settings, and user login credentials, for each buyer user, buyer's agent, each seller, seller's agent, brokerage users, lender users for providing approvals, and other such real estate users), a firewall 854, servers of third party document services 860, servers and systems of lenders 865 (or "lender system 865"), a set of real estate transaction facilitation and incoming property offer notification servers 870, a property listing database 880, a property offers database 885, a notification of property offers database 890, an offer tracking database 895, and a complete offer life cycle database 897.

The client-side computing devices connect to the front end cloud server computing devices 850 over a public network ("cloud"), such as the Internet, in order to sign up or login to the cloud-based real estate transaction facilitation and incoming property offer notification system 800. After sign up and login, the client-side computing devices each open a session over a private cloud network to the set of real estate transaction facilitation and incoming property offer notification servers 870. Each of the client-side computing devices includes a graphical user interface (GUI)-based real estate transaction facilitation software application or GUI-based real estate transaction facilitation mobile app. The GUIs of the real estate transaction facilitation mobile app are like those described above by reference to FIGS. 2-7. The tablet computing device 840 connects to the wireless communication point 842 to connect (via the gateway 844) to the front end cloud server computing devices 850, which process connection requests from the client-side computing devices. Typically, the connection requests come with basic user information for sign up or, when already signed up, with user credentials for login. The login user credentials are checked for validity by a user authentication module of the front end cloud server computing devices 850 based on encrypted user credentials stored in the user database 852. The encrypted user credentials are stored in the user database 852 after sign up for each buyer, agent, and seller who uses the cloud-based real estate transaction facilitation and incoming property offer notification system 800 to facilitate a real estate transaction.

Like client-side computing devices, which are utilized by buyers, buyer agents, sellers, seller agents, and other real estate professionals who connect to the cloud-based real estate transaction facilitation and incoming property offer notification system 800 via GUI-based real estate transaction facilitation software applications or mobile apps, lenders, such as banks, mortgage lenders, and other financial institutions, also connect to the cloud-based real estate transaction facilitation and incoming property offer notification system 800. Unlike buyers, buyer agents, sellers, seller agents, and other such users, lenders typically login and connect to provide verification of funding for a buyer. As such lender users typically interact with the cloud-based real estate transaction facilitation and incoming property offer notification system 800 by way of a GUI-based real estate transaction lender software application that runs on the lender system 865. In some embodiments, the GUI-based real estate transaction lender software application is different from the software used by buyers, buyer agents, sellers, seller agents, and other such real estate professionals in that the GUI-based real estate transaction lender software application is customized for lenders and their needs to provide verification of funds and upload of pre-approval, approval, and fund verification documents. Furthermore, lender users provide login credentials, which are encrypted and stored in the user database 852 after sign-up as a verified lender.

Upon valid authentication of the login user credentials, a session is started in relation to the client-side computing device of the user (the user being a buyer, an agent of the buyer, a seller, an agent of the seller, a brokerage professional, a lender, etc.), thereby allowing the user to access the set of real estate transaction facilitation and incoming property offer notification servers 870 over the private cloud network. Similarly, lenders login with lender user credentials, which then starts a lender session in connection with the lender system 865, thereby allowing the lender user to provide verification of funding for any particular buyer in connection with a particular real estate offer. The verification of funding may include funding documents or other such documents, which would be uploaded to the real estate transaction facilitation and incoming property offer notification server 870 over the private cloud network after authentication by the user authentication module of the front end cloud server computing devices 850 based on encrypted lender user credentials stored in the user database 852.

Also, the real estate transaction facilitation and incoming property offer notification servers 870 are line of business servers (LOB server computing devices) with at least a server-side real estate transaction facilitation and incoming property offer notification system software application and a database management system for storing data in and retrieving data from the property listing database 880, the property offers database 885, the notification of property offers database 890, the offer tracking database 895, and the complete offer life cycle database 897. The real estate transaction facilitation and incoming property offer notification servers 870, the property listing database 880, the property offers database 885, the notification of property offers database 890, the offer tracking database 895, and the complete offer life cycle database 897 are accessed over the private network connection for the client-side computing device session through a firewall 854 that secures data and system integrity for the real estate transaction facilitation and incoming property offer notification servers 870, the property listing database 880, the property offers database 885, the notification of property offers database 890, the offer tracking database 895, and the complete offer life cycle database 897. In some embodiments, the real estate transaction facilitation and incoming property offer notification server 870 includes a plurality of modules, systems, sub-systems, and monitoring units that accelerate real estate transactions and monitor brokerage and agent activity for compliance with expected standards and practices and regulations of local, state, or federal origin, including standards, such as a code of ethics in the real estate industry, and other such standards. In this way, the real estate transaction facilitation and incoming property offer notification server 870 is able to reduce liability exposure while offering secure functionality that enhances trust in buyers, buyer agents, sellers, seller agents, and other such users. A detailed example of the plurality of modules, systems, sub-systems, and monitoring units of a real estate transaction facilitation and incoming property offer notification server 870 is described below, by reference to FIG. 15.

To make the real estate transaction facilitating process and the incoming property offer notification system of the present disclosure, one may code the software and then run the software on the networked server(s) to allow client-side computing devices to interact with the real estate transaction facilitation and incoming property offer notification system (or another platform that is accessible to the client computing device users, such as buyers, sellers, and agents). In some embodiments, the real estate transaction facilitation and incoming property offer notification system includes a front end graphical portal that is implemented as a website hosted on one or more of the front end cloud server computing devices 850. As such, the website may be deployed as a cloud service which includes development and deployment by a web developer or computer programmer.

To use the real estate transaction facilitating process and the incoming property offer notification system of the present disclosure, the user goes to the cloud-network web service (e.g., a website, such as AuthenticOffer.com which implements one or more embodiments of the real estate transaction facilitating process and system described in this specification) and follows the steps on the website to achieve a desired result. Seller to see the offers and get instant notification when an offer has been submitted. Buyers to see how many offers there are on a properties and to ensure the seller sees their offer. Buying agents to see how many offers are on a property for their clients and to submit offers online to the listing agent. Listing agent to have all offers in one place and to get notified on all offers that are submitted.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing or cursor control devices. The output devices 935 display images generated by the electronic system 900. The output devices 935 include printers and display devices, such as cathode ray tubes (CRT) or liquid crystal displays (LCD). Some embodiments include a touchscreen that functions as both an input and output device.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

In some embodiments, brokerages can perform tasks and operations related to offer regulation, offer and agent activity monitoring, and other duties and jobs related to offers received for properties listed by a brokerage. One such task is when a brokerage office wants to keep track of the number of offers their agents have and offer status (active, countered, withdrawn, backup, etc.) for each offer of a listed property (or any listed property offer) to monitor agents' activity and ensure compliance with expectations and practices in the industry as pertaining to buyer, seller, and agent expectations, as well as insurance coverage and other aspects.

By way of example, FIG. 10 conceptually illustrates an agent offer quantity and status monitoring process 1000 for a brokerage to track offers, offer states, and activities of an agent associated with the brokerage in some embodiments. As shown in this figure, the agent offer quantity and status monitoring process 1000 for a brokerage to track offers, offer states, and activities of an agent associated with the brokerage is performed by an authorized brokerage user who provides pre-filtering information and starts the process, and is also performed in the backend by an offer monitor unit. For example, a brokerage manager or supervisor starts the process which triggers the offer monitor unit to activate in the backend hardware and software computing infrastructure of the brokerage, which completes several operations that provide information for the brokerage manager or supervisor to review agent activity with respect to offers on listed properties. Examples of the backend hardware and software computing infrastructure of the brokerage include, without limitation, a real estate transaction facilitation and incoming property offer notification system, a real estate transaction facilitation and incoming property offer notification server, and a plurality of modules, databases, programs, systems, sub-systems, system architectures, event management systems organized over a network-based event architecture, databases management systems associated with object-oriented databases, structured data storage databases (e.g., SQL-oriented data record structures), encrypted databases, distributed databases (including distributed ledgers and blockchain database management systems), monitoring units, and many other such embedded or integrated functional systems, control units, or programmatic modules.

In some embodiments, the real estate transaction facilitation and incoming property offer notification system includes the offer monitor unit in the backend-accessible tools and features available for management of offers and property listings. In some embodiments, the real estate transaction facilitation and incoming property offer notification server of the real estate transaction facilitation and incoming property offer notification system is communicably connected to the offer monitor unit. In some embodiments, the offer monitor unit is integrated with the real estate transaction facilitation and incoming property offer notification server of the real estate transaction facilitation and incoming property offer notification system. In some embodiments, the offer monitor unit is embedded into the real estate transaction facilitation and incoming property offer notification server of the real estate transaction facilitation and incoming property offer notification system and is integrated with the plurality of modules, systems, sub-systems, and monitoring units of the real estate transaction facilitation and incoming property offer notification server. An example of the offer monitor unit is described below, by reference to FIG. 15.

In some embodiments, the agent offer quantity and status monitoring process 1000 includes a step for selection of a particular agent to monitor (at 1005). While this example includes a selection of a particular agent, an offer monitor unit (described below, by reference to FIG. 15) may accept a selection of a particular listed property to allow review of all offers made with respect to the particular listed property, or alternatively, may accept a command to review all offers of all agents in connection with all listed properties associated with the brokerage. In other words, any variety of pre-filtering can be done to focus the agent offer quantity and status monitoring process 1000 in a way that yields accurate agent activity information in connection with each offer for each property, for a single selected agent, for multiple select agents, or brokerage-wide for all agents. Therefore, while the agent offer quantity and status monitoring process 1000 is described with respect to a single agent and the activity of that agent in connections with offers associated with the agent (e.g., for properties which the agent has listed), it is noted that the functional aspects of the agent offer quantity and status monitoring process 1000 (and, likewise, the offer monitor unit, described by reference to FIG. 15) are not limited to mere selection of a single, particular agent.

In some embodiments, the agent offer quantity and status monitoring process 1000 retrieves offers (at 1010) associated with the particular agent. In some embodiments, all offers for properties listed by agents associated with the brokerage are stored in an offer tracking database. Therefore, the agent offer quantity and status monitoring process 1000 of some embodiments retrieves the offers (at 1010) from the offer tracking database. The offer tracking database is described by reference to FIG. 8, above, and is further described below, by reference to FIG. 15. In some embodiments, the offer monitor unit accesses the offer tracking database to retrieve the offers.

After retrieving the offers (associated with the particular agent), the agent offer quantity and status monitoring process 1000 of some embodiments counts the total number of retrieved offers (at 1020) associated with the particular agent. For example, while offers may be retrieved in connection with the particular agent, the pre-filtering may have specified a particular property listed by the particular agent and, thus, the offers would all be offers made by potential buyers/buyer agents for the particular property. Similarly, the retrieved offers may include all offers made in connection with all properties listed by the particular agent. An example of an offers list and user interface that enables agents and brokerages to view all offers and monitor offer status and activity related to each offer is described below, by reference to FIG. 14.

In some embodiments, the agent offer quantity and status monitoring process 1000 then selects an offer (at 1030) from the retrieved offers. For example, the offer monitor unit selects a first offer listed among the set of retrieved offers. Next, the agent offer quantity and status monitoring process 1000 checks the status of the selected offer (at 1040). In some embodiments, the status of the offer is one of active, countered, withdrawn, and backup. However, there may be other items to indicate the status of the offer.

In some embodiments, the agent offer quantity and status monitoring process 1000 adds an entry for the selected offer in a specific offer status list of an agent activity report (at 1050) based on the checked status of the offer. Examples of the specific offer status list include, without limitation, an active offers list, a counter offers lists, a withdrawn offers list, and a backup offers list. After adding the entry for the selected offer in the specific offer status list of the agent activity report (at 1050), the agent offer quantity and status monitoring process 1000 determines (at 1060) whether there are any more offers to review among the retrieved offers. When there are no more offers to review in the set of retrieved offers, the agent offer quantity and status monitoring process 1000 continues forward to add information to and deliver the agent activity report, as described further below. On the other hand, when there are remaining offers in the set of retrieved offers to be reviewed, then the agent offer quantity and status monitoring process 1000 selects (at 1070) the next offer and transitions back to the step for checking the status of the selected offer (at 1040), as described above. This process of cycling back through the steps (at 1040, 1050, 1060, and 1070) continues until there are no remaining offers to review in the set of retrieved offers.

In some embodiments, the agent offer quantity and status monitoring process 1000 continues forward after all of the retrieved offers have been processed. In some embodiments, the agent offer quantity and status monitoring process 1000 then adds (at 1080) the name of the particular agent (or each agent, if multiple selected) and the total number of retrieved offers to the agent activity report. Next, the agent offer quantity and status monitoring process 1000 provides the agent activity report (at 1090) to the authorized agent of the brokerage. In some embodiments, the agent offer quantity and status monitoring process 1000 provides the agent activity report by visually outputting the report onto a monitor of a computing device used by the authorized agent. In some embodiments, the agent offer quantity and status monitoring process 1000 provides the agent activity report by printing a hard copy of the report out of a printer. In some embodiments, the agent offer quantity and status monitoring process 1000 provides the agent activity report by storing the report in a database and providing information to the authorized agent on how to access the report from the database. In some embodiments, the agent offer quantity and status monitoring process 1000 provides the agent activity report by electronically transmitting the report to the authorized agent. The report is electronically transmitted by sending as an email attachment to an email address associated with the authorized agent or by performing a peer-to-peer file transfer of the report to a computing device used by the authorized agent or by text message delivery, or any other electronic delivery mechanism. After providing the agent activity report (at 1090) to the authorized agent of the brokerage, the agent offer quantity and status monitoring process 1000 of some embodiments ends.

While tracking the status of offers is important to many brokerages (and individual agents, for that matter), it is also true that most (if not all) brokerages have a vested interest in keeping track of the number of property listings created by their agents, so as to comply with the scope of their listing license (which may constrain the number of listings and quantity of listings in a particular state, such as active, sold, or pending). Furthermore, when given the relevant information, brokerages may wish to regulate the offers and listings that are under their license. For instance, many brokerages would like the ability to approve/disapprove of submissions, as well as amend submissions to avoid liability. Brokers receive multiple complaints from buyers' agents and buyers about their offers never being shown, so it follows that brokerages have a vested interest in eliminating suspicions that offers were not shown to sellers. By effectively managing the offers, listings, and these license details, brokerages and brokers of the agency will tremendously lower their liability and lawsuits. In some embodiments, the real estate transaction facilitation and incoming property offer notification system provides such broker regulation, listing license compliance, and monitoring of offers and listings of agents and brokers of the brokerage.

By way of example, FIG. 11 conceptually illustrates a brokerage property listings license compliance process 1100 for tracking property listings associated with the brokerage and determining whether the number and types of property listings of the brokerage complies with the listing license in some embodiments. In some embodiments, the brokerage property listings license compliance process 1100 is performed, in part, by a broker listing tracking module and, in other part, by a brokerage regulation sub-system.

In some embodiments, the real estate transaction facilitation and incoming property offer notification system includes the broker listing tracking module as a brokerage-specific service. In some embodiments, the real estate transaction facilitation and incoming property offer notification server of the real estate transaction facilitation and incoming property offer notification system is communicably connected to the broker listing tracking module. In some embodiments, the broker listing tracking module is integrated with the real estate transaction facilitation and incoming property offer notification server of the real estate transaction facilitation and incoming property offer notification system. In some embodiments, the broker listing tracking module is embedded into the real estate transaction facilitation and incoming property offer notification server of the real estate transaction facilitation and incoming property offer notification system and is integrated with the plurality of modules, systems, sub-systems, and monitoring units of the real estate transaction facilitation and incoming property offer notification server. Examples of a broker listing tracking module are described further below, by reference to FIG. 15.

In some embodiments, the real estate transaction facilitation and incoming property offer notification system includes the brokerage regulation sub-system as a brokerage tool to manage property listings with respect to licensing and risk exposure. In some embodiments, the real estate transaction facilitation and incoming property offer notification server of the real estate transaction facilitation and incoming property offer notification system is communicably connected to the brokerage regulation sub-system which runs separately over the network at a location it is able to access the listing license for the brokerage. In some embodiments, the listing license is remote and is shielded behind a private cloud in which the brokerage regulation sub-system runs with private network access available to authenticated users of the brokerage by way of a read-only access connection stream into the private cloud from the real estate transaction facilitation and incoming property offer notification server or authenticated brokerage user devices. In some embodiments, the brokerage regulation sub-system is integrated with the real estate transaction facilitation and incoming property offer notification server of the real estate transaction facilitation and incoming property offer notification system. In some embodiments, the brokerage regulation sub-system is embedded into the real estate transaction facilitation and incoming property offer notification server of the real estate transaction facilitation and incoming property offer notification system and is integrated with the plurality of modules, systems, sub-systems, and monitoring units of the real estate transaction facilitation and incoming property offer notification server. Examples of a brokerage regulation sub-system are described further below, by reference to FIG. 15.

In some embodiments, the brokerage property listings license compliance process 1100 starts by retrieving (at 1105) all property listings associated with the brokerage. In some embodiments, the property listings are retrieved from the property listing database. In some embodiments, the brokerage property listings license compliance process 1100 also counts (at 1105) the total number of listings as retrieved.

Next, the brokerage property listings license compliance process 1100 of some embodiments retrieves a listing license (at 1110) associated with the brokerage and compares the total number of listings to a permitted number of listings that is within the scope of the listing license. In some embodiments, the brokerage property listings license compliance process 1100 then determines (at 1115) whether the total number of listings for the brokerage exceeds the permitted number of listings (the "license limit"). When the total number of listings for the brokerage exceeds the license limit, then the brokerage property listings license compliance process 1100 notifies (at 1160) the brokerage of a possible breach of the number of listings it is permitted under the license. In some embodiments, the notification indicates a possible breach (instead of an absolute breach) because the listing license may include grace periods for correcting the number of listings to comply with the license limitations or may allow the brokerage to increase the scope of coverage under the license up to the total number of listings. In some embodiments, when the total number of listings exceeds the license limit, the broker listing tracking module may configure a setting to block any new property listing creation/submission by any agent associated with the brokerage. In this way, the brokerage can resolve the discrepancy between the total number of listings and the license limit before newly created property listings are submitting for online publication, and thereby demonstrate its good faith efforts to comply with the listing license limitations.

On the other hand, when the total number of listings for the brokerage is within the scope of the license limit, then the brokerage property listings license compliance process 1100 proceeds to check (at 1120) the listing license for limitations on the types of property listings (e.g., active, sold, pending). To check for limitations on the types of property listings in the license, the brokerage property listings license compliance process 1100 of some embodiments selects a first listing type limitation from the listing license (at 1125). Then the brokerage property listings license compliance process 1100 identifies (at 1130) listings that match the selecting listing type (limitation in the license) among all the retrieved listings for the brokerage. The brokerage property listings license compliance process 1100 of some embodiments then counts (at 1135) the identified listings that match the listing type selected from the listing license.

In some embodiments, the brokerage property listings license compliance process 1100 determines (at 1140) whether the count of identified listings that match the listing type selected from the listing license is greater than the listing license permits or not. When the count of identified listings that match the listing type selected from the listing license is not greater than the quantity allowed by the listing license, then the brokerage property listings license compliance process 1100 proceeds to determine (at 1150) whether there are any more listing type limits in the listing license or not. The steps following the determination (at 1150) are further described below.

Turning back to the determination (at 1140), when the count of identified property listings for the brokerage that match the listing type selected from the listing license is (affirmatively) greater than the listing license allows for that listing type, then the brokerage property listings license compliance process 1100 first notifies the brokerage (at 1145) of the possible breach of the listing type limitation in the listing license, and continues forward to the determination (at 1150) of whether there are any more listing type limits in the listing license or not. In some embodiments, the notification (at 1145) indicates a possible breach (instead of an absolute breach) because the listing license may include grace periods for correcting the number of listings that match the given property listing type, in order to comply with the license limitations. Similarly, the license may allow the brokerage to increase the scope of coverage under the license for the type of listings that would be in breach. Also, when the count of listings that match the given listing type exceeds the scope permitted by the license, the broker listing tracking module may configure a setting to block any property listing type updates, changes, or additions that would violate the license limit for the type of listing. In this way, the brokerage can maintain compliance for listing type issues or dependencies, and thereby demonstrate its good faith efforts to comply with the listing type limitations of the listing license.

Turning back to the determination (at 1150), when there are more listing type limits in the listing license, the brokerage property listings license compliance process 1100 proceeds to select the next listing type limitation from the listing license (at 1155). In some embodiments, the brokerage property listings license compliance process 1100 then transitions back to the step for identifying (at 1130) listings that have a listing type which matches the selected (next) listing type limitation in the listing license, identifying them among all the retrieved listings for the brokerage, followed by counting (at 1135) the identified listings that match the selected (next) listing type. The brokerage property listings license compliance process 1100 continues this cycle until it determines (at 1150) that there are no more listing type limitations in the listing license. In some embodiments, the brokerage property listings license compliance process 1100 then ends.

Many users of the real estate transaction facilitation and incoming property offer notification system intend to make offers on one or more listed properties, but prefer to first review additional listings before deciding on making an offer or not for a particular property. The real estate transaction facilitation and incoming property offer notification system offers a simple way of saving/watching listed properties by adding particular listed properties to a favorites list. In some embodiments, offers for any given property are time-constrained, such that an offer must be submitted before a final offer review period begins. In some embodiments, the real estate transaction facilitation and incoming property offer notification system provides an offer countdown feature (or "countdown timer") that is automatically associated with each listed property a user marks as a favorite property. In some embodiments, the countdown timer determines a time at which final offer review is scheduled to start and sets a timed countdown until the final offer review is supposed to start. In some embodiments, the countdown timer includes one or more timed notifications that are triggered and sent to the user when a remaining amount of time until final offer review meets a specific, configured time settings for the countdown timer. For example, the timed notifications may indicate the remaining time, in number of days, to submit an offer before final offer review starts. Thus, the user may receive an email message, a text message, or a notification in the mobile app or website (when logged in) with a notification stating "Hurry!!! You have 3 more days to get your offer in before final offer review Monday Nov. 30, 2020 10:00 am" or the like.

By way of example, FIG. 12 conceptually illustrates an offer countdown process 1200 for sending notifications of remaining time to submit offers until final offer review in some embodiments. In some embodiments, the offer countdown process 1200 is performed by an offer countdown module. In some embodiments, the real estate transaction facilitation and incoming property offer notification system includes the offer countdown module as a process module that can be launched as separate instances by any user (agent or brokerage) or any programmatic user process. In some embodiments, the real estate transaction facilitation and incoming property offer notification server of the real estate transaction facilitation and incoming property offer notification system is communicably connected to the offer countdown module and runs on each user device as a serverless process or semi-autonomous process. In some embodiments, the offer countdown module is integrated with the real estate transaction facilitation and incoming property offer notification server of the real estate transaction facilitation and incoming property offer notification system. In some embodiments, the offer countdown module is embedded into the real estate transaction facilitation and incoming property offer notification server of the real estate transaction facilitation and incoming property offer notification system and is integrated with the plurality of modules, systems, subsystems, and monitoring units of the real estate transaction facilitation and incoming property offer notification server. In some embodiments, the offer countdown module is associated with one or more event listener processes that are implemented on the real estate transaction facilitation and incoming property offer notification server according to the event architecture standard of the network event architecture in the backend hardware computing infrastructure of the real estate transaction facilitation and incoming property offer notification system.

In some embodiments, the offer countdown module is triggered to start when a buyer or buyer's agent adds a listed property to their favorites, or otherwise makes the listed property a watched property. Thus, the offer countdown process 1200 starts when the buyer or buyer agent ("user") adds (at 1205) the property listing to favorites ("user favorites"), making the property listing a property to save and watch for the user.

In some embodiments, the offer countdown process 1200 associates an instance of a countdown timer with the property listing added by the user to the user favorites (at 1210). After associating the instance of the countdown timer with the property listing added to the user favorites, the offer countdown process 1200 of some embodiments launches the offer countdown module to scan for a final offer review date/time (at 1215). The offer countdown module scans a variety of information about the property listing added to the user favorites. In some embodiments, the property listings database 880 (described above by reference to FIG. 8, and further described below, by reference to FIG. 15) includes encoded data that is structurally organized in a way that allows the offer countdown module and other modules and systems to scan the encoded data to quickly find information (if any) that specifies a final offer review date and/or time. In some embodiments, the encoded data is encapsulated into a single encoded data object that stores the information for each separate property listing stored in the property listing database 880. In some embodiments, the encoded data is structurally organized according to extensible markup language (XML). In some embodiments, the encoded data is structurally organized according to a spreadsheet data standard for comma-separated values (CSV) a text file standard for tab delimited files or tab-separated value (TSV). The property listing database 880 of some embodiments stores the single encoded data object after encryption. In some embodiments, the single encoded data object is encrypted by a hash function that implements an encryption function, such as SHA-2 256, SHA-2 512, SHA-3, etc. Furthermore the single encoded data object itself encapsulates all non-file data and any XML files, CSV spreadsheet files, TSV text files, and other value delimited files as hash encrypted byte streams.

In some embodiments, the offer countdown process 1200 then determines (at 1220) whether the property listing includes final offer review date/time information or not. In some cases, the seller or seller's agent may not add final offer review date/time information at the same time as when the property listing was created and submitted for online publication. In some cases, the seller/seller agent only adds the final offer review date/time after receiving a threshold number of offers for a given property listing. When the final offer review date/time is not available for the property listing, the offer countdown process 1200 of some embodiments sets an event listener (at 1225) to capture updates of information that are made to the property listing. Then the offer countdown process 1200 determines (at 1230) whether an information update event has been posted to the property listing. As this event listener is a program (that is based on the network event architecture), the determination (at 1230) repeats in a continuous cycle until updated information can be detected and captured for the property listing. When that occurs, the information update event triggers the offer countdown process 1200 to continue where it left off and the event listener ends the continuously cycle.

Thus, when information for the final offer review is determined (at 1220) to be available for the property listing, the offer countdown process 1200 retrieves (at 1235) the final offer review date/time information for the property listing in the user favorites. Next, the offer countdown process 1200 calculates (at 1240) the number of days to submit an offer before advent of the final offer review date/time.

In some embodiments, the offer countdown process 1200 sets (at 1245) the countdown timer for the property listing in user favorites to the calculated number of days prior to the start of final offer review. In some embodiments, the offer countdown process 1200 loads (at 1250) a list of threshold times to send notification(s) of the remaining time (before final offer review) to the user (buyer and/or buyer agent). In some embodiments, the list of threshold times is user-configurable so that one or all of the threshold times may be deactivated by user selection/command, and the user may create custom notifications and trigger times at which to send the notifications before the start of final offer review.

In some embodiments, the offer countdown process 1200 then starts the countdown timer (at 1255) to count down from the calculated number of days before final offer review begins. Next, the offer countdown process 1200 determines (at 1260) whether the current date/time is the same as the final offer review date/time (or whether the final offer review date/time is now). In some embodiments, the offer countdown process 1200 checks the remaining time on the countdown timer and compares it with a calculation of the difference in time between the final offer review date/time and a current date/time, as digitally specified by a date and time authority over the Internet. If and when a significant discrepancy is detected, then the offer countdown process 1200 re-launches a new instance of an offer countdown module and re-associates a new countdown timer with the property listing in the user favorites, making the noted calculations and settings described above.

When the final offer review date/time is not determined (at 1260) to be now, then an amount of time remains for the countdown timer and the offer countdown process 1200 determines (at 1265) whether the amount of time that remains is the same as, or has elapsed past, a threshold time as loaded or as customized by the user. When the time that remains for the countdown timer is not the same as, or elapsed past, the threshold time as loaded or customized, then the offer countdown process 1200 transitions back to the step for determining (at 1260) whether the current date/time is the same as (or past) the final offer review date/time, as described above. However, when the time that remains for the countdown timer is the same as, or has elapsed past, the threshold time as loaded or customized, the offer countdown process 1200 of some embodiments sends a notification to the user (at 1270) indicating that offer submissions are still possible and stating the remaining time (e.g., in days) until the start of the final offer review stage. For example, the notification may state: "Hurry!!! You have 3 more days to get your offer in before final offer review Monday Nov. 30, 2020 10:00 am" or something similar. After sending the notification, the offer countdown process 1200 transitions back to the step for determining (at 1260) whether the current date/time is the same as (or past) the final offer review date/time, as described above. The threshold time notification-triggering cycle is continuous until the countdown timer reaches zero, which is same as the scheduled time for final offer review.

Thus, when the final offer review date/time is determined (at 1260) to be now, the offer countdown process 1200 of some embodiments stops the countdown timer (at 1275) that is associated with the property listing in the user favorites. In some embodiments, the offer countdown process 1200 also updates the property listing in the user favorites to indicate that the offer submission period has expired. In some embodiments, the offer countdown process 1200 only updates a copy of the property listing in the user favorites, but not in the published online site, thereby indicating that the offer submission period has expired only for the copy the user (buyer and/or buyer agent) can see. In some other embodiments, the offer countdown process 1200 updates the property listing in the user favorites and in the published online property listing, thereby allowing all users to see the updated information that the offer submission period is over and the property listing is in final offer review. Then the offer countdown process 1200 ends.

In some embodiments, the real estate transaction facilitation and incoming property offer notification system provides the ability to convert offers to counter offers and the ability to manage offers and counter offers, to accept offers, deny or decline offers, to make counter offers, etc. In some embodiments, the real estate transaction facilitation and incoming property offer notification system assigns offers to backup status and are used if an initial accepted offer falls through. In some embodiments, the real estate transaction facilitation and incoming property offer notification system includes an offer and backup offer management system that provides the features and functions to manage offers, counter offers, and backup offers by direction of the agent, seller, and/or brokerage. In some embodiments, a real estate transaction facilitation and incoming property offer notification server of the real estate transaction facilitation and incoming property offer notification system is communicably connected to the offer and backup offer management system. In some embodiments, the offer and backup offer management system is integrated with the real estate transaction facilitation and incoming property offer notification server of the real estate transaction facilitation and incoming property offer notification system. In some embodiments, the offer and backup offer management system is embedded into the real estate transaction facilitation and incoming property offer notification server of the real estate transaction facilitation and incoming property offer notification system and is integrated with the plurality of modules, systems, sub-systems, and monitoring units of the real estate transaction facilitation and incoming property offer notification server. In some embodiments, the offer and backup offer management system is associated with one or more event listener processes that are implemented on the real estate transaction facilitation and incoming property offer notification server according to the event architecture standard of the network event architecture in the backend hardware computing infrastructure of the real estate transaction facilitation and incoming property offer notification system.

By way of example, FIG. 13 conceptually illustrates an offer and backup offer management process 1300 for converting offers to counter offers, setting offers as backup offers, and managing counter offers to accept, deny, or counter in some embodiments. In some embodiments, the offer and backup offer management process 1300 is performed by the offer and backup offer management system. In some embodiments, the offer and backup offer management process 1300 starts when the buyer or buyer agent ("user") submits a type of offer (at 1305) associated with a property listing created by a seller agent for a seller. In some embodiments, the offer and backup offer management process 1300 proceeds to the step at which the offer and backup offer management system automatically retrieves information about the submitted offer (at 1310). Then the offer and backup offer management process 1300 proceeds to the next step at which the offer and backup offer management system detects (at 1315) the type of offer submitted by the user. For example, the type of offer may be first offer from a new user, an updated offer from a user who already made one or more offers on the given property listing, etc.

In some embodiments, the offer and backup offer management process 1300 determines (at 1320) whether the submitted offer is a first offer from the user for the listed property. When the submitted offer is determined (at 1320) to be a first offer from the user, the offer and backup offer management process 1300 sends a notification (at 1325) to the seller/agent that an offer from a new buyer/agent has been received. On the other hand, when the submitted offer is not determined (at 1330) to be a first offer, then the offer and backup offer management process 1300 sends a different notification (at 1330) to the seller/agent indicating that an updated offer has been received from a buyer/agent with one or more previous offer(s) for the given property listing.

In some embodiments, the offer and backup offer management process 1300 then compares (at 1335) the offer submitted by the user to other offers associated with the listed property. This can be accomplished automatically by the offer and backup offer management system or by the seller/agent manually. If the seller/agent is manually checking, then the seller/agent is likely to view other offerings in an offers list that shows all offers, such as the offers list and user interface (UI) described below, by reference to FIG. 14. If done automatically by the offer and backup offer management system, the list of offers is retrieved from the offers tracking database 895 by the offer and backup offer management system. The comparison of the present offer from the user to all other offers will yield information that directs the next step, at which the offer and backup offer management process 1300 determines (at 1340) whether another offer is already accepted for the property listing. When another offer has already been accepted by the seller/agent for the property listing, then the offer and backup offer management process 1300 sets the submitted offer from the user to a backup offer status (at 1345). After this step, the offer and backup offer management process 1300 determines (at 1355) whether the accepted offer has failed to close or not. When the accepted offer has not failed to close, then the offer and backup offer management process 1300 moves ahead to the step at which the seller/agent closes the sale for the listed property according to the accepted offer (at 1365) and then ends. However, when the accepted offer has (affirmatively) failed to close, then the offer and backup offer management process 1300 moves ahead to another step at which the seller/agent identifies a backup offer for acceptance (at 1360), which may or may not be the submitted offer of the user in this case. Nevertheless, the offer and backup offer management process 1300 demonstrates how the brokerage is able to ensure swift consideration of backup offers when or if initial offers and acceptances fall through.

Now, turning back to the determination (at 1340), when another offer has not been accepted, the offer and backup offer management process 1300 sends a notification (at 1350) to the seller/agent to manage the submitted offer. For example, the seller/agent can view the details of the offer and then decide to accept the offer, deny or decline the offer, or make a counter offer to send back to the buyer/agent for consideration. After the seller/agent makes a selection to manage the submitted offer, the offer and backup offer management process 1300 determines (at 1370) whether the seller/agent has declined or not. When the seller/agent declines the submitted offer, the offer and backup offer management process 1300 transitions over to the step for setting (at 1345) the submitted offer from the user to backup status. However, when the seller/agent has not declined the submitted offer from the user, then the offer and backup offer management process 1300 determines (at 1375) whether the seller/agent has accepted the submitted offer from the user. When the seller/agent has accepted the submitted offer of the user, then the offer and backup offer management process 1300 moves on to the step at which the seller/agent closes the sale for the listed property (at 1365) at the accepted offer (as submitted by the user). On the other hand, when the seller/agent has not accepted (and not declined) the submitted offer from the user, then the offer and backup offer management process 1300 determines (at 1380) whether the seller/agent is making a counter offer to send back to the user who submitted the offer. When the seller/agent makes a counter offer, the offer and backup offer management process 1300 moves forward to the next step at which the seller/agent sends the counter offer back to the buyer/agent (the user who submitted the offer), followed by the buyer/agent user managing the counter offer (at 1390) accordingly (accept counter offer, deny or decline counter offer, counter-counter offer). The offer and backup offer management process 1300, therefore, provides a simple, yet powerful, way to manage offers, counter offers, etc.

By way of example, FIG. 14 conceptually illustrates an offers list and user interface (UI) 1400 that enables agents and brokerages to view all offers and monitor offer status and activity related to each offer in some embodiments. In some embodiments, the offers list and user UI 1400 is accessible to authorized brokerage users via the cloud-network web service. The cloud-network web service may be implemented as a website (such as AuthenticOffer.com) which includes user-selectable tools and options to view offers, monitor offers and listings, export offers and listings for compliance review, create new property listings, and other manage and review offers and listings by the brokerage and its agents. In some embodiments, the offers list and user UI 1400 is implemented for mobile devices that run a mobile app to access and interact with the real estate transaction facilitating process and system described in this specification.

Turning to another example, FIG. 15 includes a block diagram that conceptually illustrates a plurality of modules, systems, sub-systems, and monitoring units of a real estate transaction facilitation and incoming property offer notification server 1500 in some embodiments. As shown in this figure, the block diagram of the plurality of modules, systems, sub-systems, and monitoring units of the real estate transaction facilitation and incoming property offer notification server 1500 includes a real estate transaction facilitation and incoming property offer notification system 1502 to which a buyer agent 1504 connects to submit an offer on a property listing. The block diagram of the plurality of modules, systems, sub-systems, and monitoring units of the real estate transaction facilitation and incoming property offer notification server 1500 also shows a seller agent 1506, a brokerage 1508, a listing compliance module 1510, and a lender 1512, each of whom connects to the real estate transaction facilitation and incoming property offer notification system 1502 via a computing device with interactive software to facilitate real estate transactions (such as a browser that connects to the AuthenticOffer.com website and interacts with the system 1502 after authenticated login). Examples of the interactive software include, without limitation, browser software, mobile app software running on a mobile device (such as those noted above by reference to FIGS. 2-7), or custom interfacing software tailored for specific technical workflow operations associated with the seller agent 1506 (customized to create and submit property listings, receiving notifications of new offers or updated information about existing offers, manage offers, review and manage listings, etc.), the brokerage 1508 (customized to review submitted property listings, approve/deny property listings, manage property listings, review agent activity, review brokerage and individual agent offers and listings, review scope of listing compliance via listing compliance module 1510 and limitations that may prompt changes to property listings, etc.), the buyer agent 1504 (customized to review and save property listings, submit offers for property listings, receive notifications about saved property listings and submitted offers, upload documents for submitted offers, manage offers, etc.), and the lender (customized to provide loan approvals, loan application documents, loan approval documents, etc.).

The real estate transaction facilitation and incoming property offer notification system 1502 includes modules, databases, programs, systems, sub-systems, system architectures, event management systems, servers, data encryption modules, database managers whether local, directly connected database or logically connected, distributed databases (including distributed ledgers and blockchain database management systems), monitoring units, and many other such embedded data engines or integrated functional systems, control units, or programmatic management modules. Specifically, the real estate transaction facilitation and incoming property offer notification system 1502 includes a real estate transaction facilitation and incoming property offer notification server 1514, an offer intake & extraction module 1516, a brokerage regulation sub-system 1518, a broker listing tracking module 1520, an offer monitor 1522, an offer countdown module 1524, an offer and backup offer management system 1526, a lender fund verification module 1528, an offer approval and validation compliance system 1530, an offer tracking database 1548, a property listings database 1550, and a complete offer life cycle database 1552. In some embodiments, the offer tracking database 1548 is similar to offer tracking database 895, described above by reference to FIG. 8. In some embodiments, the property listings database 1550 is similar to property listings database 880, described above by reference to FIG. 8. In some embodiments, the complete offer life cycle database 1552 is similar to complete offer life cycle database 897, described above by reference to FIG. 8.

Additionally, the real estate transaction facilitation and incoming property offer notification server 1514 performs several operations in connection with the several modules, databases, programs, systems, sub-systems, data encryption modules, database managers, monitoring units, countdown timers, and other such programmatic management modules. The operations include performing offer intake 1532, extracting and storing offer details 1534, checking the number of listings 1536, monitoring offers and agent activity 1538, tracking time until offer review and sending notifications 1540, changing offer status 1542, incorporating lender verification details 1544, and validating offers and approving/denying offers 1546.

In some embodiments, the buyer agent 1504 submits an offer (an "incoming offer") for a property listing when connected to the real estate transaction facilitation and incoming property offer notification system 1502. The connection to the real estate transaction facilitation and incoming property offer notification system 1502 by the computing device of the buyer agent 1504 may be made, for example, over the Internet to a cloud-based real estate transaction facilitation and incoming property offer notification service hosted by a web server in the real estate transaction facilitation and incoming property offer notification system 1502. In some embodiments, the web server may be deployed on the real estate transaction facilitation and incoming property offer notification server 1514 or another server within the real estate transaction facilitation and incoming property offer notification system 1502.

In some embodiments, the incoming offer is received by the offer intake & extraction module 1516 running on the real estate transaction facilitation and incoming property offer notification server 1514. The offer intake & extraction module 1516 then performs offer intake 1532 and extracts and stores the offer details 1534 from the incoming offer. In some embodiments, the real estate transaction facilitation and incoming property offer notification server 1514 stores the extracted details of the incoming offer in the offer tracking database 1548 and updates the property listing with the offer details in the property listings database 1550.

In some embodiments, the real estate transaction facilitation and incoming property offer notification server 1514 provides the extracted offer details to the brokerage regulation sub-system 1518, which, by connection to the broker listing tracking module 1520, shares the extracted offer details with the broker listing tracking module 1520. Either or both of the brokerage regulation sub-system 1518 and the broker listing tracking module 1520 may provide some or all of the extracted offer details to the seller agent 1506 and the brokerage 1508. Further, either or both of the brokerage regulation sub-system 1518 and the broker listing tracking module 1520 may review listing compliance details, by way of the listing compliance module 1510. The brokerage 1508, as a user, may access and review the listing compliance at any time. This is typically done by way of the listing compliance module 1510 (shown by dashed line connection to the brokerage 1508). In some embodiments, the broker listing tracking module 1520 affirmatively and proactively performs the operations for checking the number of brokerage property listings 1536 and monitors listing compliance, such as by the listing compliance module 1510.

In some embodiments, the offer monitor 1522 is triggered by request of the brokerage 1508, as a user, who may be seeking an agent activity report regarding a particular agent associated with the brokerage, or a comprehensive brokerage report that lists offer and listing activity of a set of agents or all agents associated with the brokerage. In some embodiments, only an authorized brokerage 1508 user may request reports and information from the offer monitor 1522. A brokerage 1508 user is authorized when the user enters valid user credentials to login to the real estate transaction facilitation and incoming property offer notification system 1502 (entering encrypted username and password which are authenticated and, if valid, verified). In some embodiments, when the real estate transaction facilitation and incoming property offer notification server 1514 verifies that the brokerage 1508 user is authentic and has the requisite user permissions to request information from the offer monitor 1522, then the real estate transaction facilitation and incoming property offer notification server 1514 launches the offer monitor 1522 to monitor offers & agent activity 1538 as requested by the authenticated brokerage 1508 user.

In some embodiments, the offer countdown module 1524 when the buyer agent 1504 selects a property listing to watch by putting the property listing in the user favorites list. In some embodiments, the real estate transaction facilitation and incoming property offer notification server 1514 triggers the offer countdown module 1524 when the property listing is added to the user favorites. The offer countdown module that creates an instance of a countdown timer and associates the countdown timer with the property listing as it appears in the favorites list of the user. Then the offer countdown module 1524 performs the process for tracking time until the start of the final offer review and for sending notifications 1540 to the buyer agent 1504 at one or more times before the countdown timer reaches zero.

Outputs from the processes for checking the number of listings 1536, monitoring offers and agent activity 1538, and tracking time until the start of the final offer review and for sending notifications 1540 are then bundled and provided for reference to the offer and backup offer management system 1526, through which offers may be managed by performing the process for changing offer status (e.g., backup offer, counter offer, counter-counter offer, etc.) and otherwise managing offers 1542 (related to the detailed offer and backup offer management process 1300 described above by reference to FIG. 13). In some cases, the offer and backup offer management system 1526 may request or receive lender information via the lender fund verification module 1528, the lender information thus informing the offer and backup offer management system 1526 in regards to managing offers. Furthermore, the lender 1512 may have access to the real estate transaction facilitation and incoming property offer notification server 1514 of the real estate transaction facilitation and incoming property offer notification system 1502. In some embodiments, the software application includes GUI-based software for authenticated lender users and a set of lender tools that are customized for, and only accessible to, the lender 1512 and other lenders, such as banks. Specifically, the lender 1512 may be requested by the buyer or buyer agent 1504 for a mortgage to cover a potential purchase of a property shown in a property listing. The lender 1512 may then generate pre-approval documents, loan approval documents and confirmations, and other financial documentation that are received by the lender fund verification module 1528 and incorporated into details of an offer by performing the process for incorporating lender verification details 1544. The seller agent 1506 associated with the property listing upon which the buyer agent 1504 made an offer, and the lender 1512 provided loan funding verification, is also then informed of the fund verification. Finally, the offer approval and validation compliance system 1530 obtains the updated offer information with the incorporated lender funding verification and performs a final process for validating the offer and moving it ahead for approval or denial 1546. All data output from the each step of the processes for performing offer intake 1532, extracting and storing offer details 1534, checking the number of listings 1536, monitoring offers and agent activity 1538, tracking time until offer review and sending notifications 1540, changing offer status 1542, incorporating lender verification details 1544, and validating offers and approving/denying offers 1546 are stored in the complete offer life cycle database 1552, and after each process step, resulting data is added (when necessary) to the offer tracking database 1548 and the property listing database 1550 as needed.

While the invention has been described with reference to numerous specific details, one of ordinary skill in the art will recognize that the invention can be embodied in other specific forms without departing from the spirit of the invention. For instance, FIGS. 1, 10, 11, 12, and 13 conceptually illustrates processes. The specific operations of each process may not be performed in the exact order shown and described. Specific operations may not be performed in one continuous series of operations, and different specific operations may be performed in different embodiments. Furthermore, each process could be implemented using several sub-processes, modules, monitoring units, systems, sub-systems, or as part of a larger macro process. Thus, one of ordinary skill in the art would understand that the invention is not to be limited by the foregoing illustrative details, but rather is to be defined by the appended claims.

I claim:

1. A real estate transaction facilitation and incoming property offer notification system comprising:

a property listing database that stores all property listings submitted by real estate agents associated with a brokerage;

an offer tracking database that stores all offers associated with each property listing of each real estate agent of the brokerage;

a real estate transaction facilitation and incoming property offer notification server comprising (i) an offer intake and extraction module that performs offer intake and extracts offer details to store in the property listing database and the offer tracking database, (ii) a brokerage regulation sub-system that performs a listing compliance check of each property listing created and submitted by real estate agents of the brokerage and notifies the brokerage of any possible compliance breach in the property listings with respect to a listing license for the brokerage, (iii) a broker listing tracking module that counts a number of currently published property listings for the brokerage and compares the counted number to a permitted number of listings provided in the listing license for the brokerage, (iv) an offer monitor that monitors offers and agent activity, (v) an offer countdown module that tracks time until a final offer review and sends notifications to interested buyers and agents of remaining time until final offer review, (vi) an offer and backup offer management system that manages offers and changes status of each offer submitted for a given property listing, (vii) a lender fund verification module that receives documentation of lender funding verification in connection with buyers who submit offers, and (viii) an offer approval and validation compliance system that validates all offers and finalizes a status of each offer as one of approved and denied;

a buyer agent computing device associated with a property buyer agent, said buyer agent computing device comprising software that visually outputs a buyer graphical user interface for the property buyer agent to submit an offer for a particular property listing associated with a particular real estate agent of the brokerage, wherein the submitted offer is received by the offer intake and extraction module of the real estate transaction facilitation and incoming property offer notification server;

a seller agent computing device associated with a property seller agent of the brokerage, said seller agent computing device comprising software that visually outputs a seller graphical user interface (GUI) for the property seller agent to create and submit property listings, wherein the brokerage regulation sub-system performs the listing compliance check in connection with the broker listing tracking module to determine whether the permitted number of listings provided in the listing license for the brokerage exceeds the counted number of currently published property listings, wherein the broker listing tracking module is configured to enable new property listing creation and submission in the seller GUI when the permitted number of listings is determined to exceed the counted number of property listings and submission of a particular new property listing is allowed, wherein the broker listing tracking module is further configured to block new property listing creation and submission in the seller GUI when the permitted number of listings does not exceed the counted number of property listings and submission of the particular new property listing is not allowed; and a listing compliance module that works in connection with the brokerage regulation sub-system and the broker listing tracking module to review scope of listing compliance and determine whether the brokerage is in compliance with listing requirements, wherein the listing compliance module reviews scope of listing compliance by checking, via the broker listing tracking module, compliance with the permitted number of listings and by checking, via the brokerage regulation sub-system, types of property listings of the brokerage, wherein the listing compliance module is accessible to the brokerage as a brokerage tool to connect the brokerage to the brokerage regulation sub-system to manage property listings with respect to licensing and risk exposure and to obtain additional licensing when the brokerage is not in compliance.

2. The real estate transaction facilitation and incoming property offer notification system of claim 1 further comprising:

a property offers database and a notification of property offers database, wherein the property offers database stores offers made by property buyers in connection with listed properties stored in the property listing database, wherein the notification of property offers database stores information for notifications sent to property sellers when offers are made in connection with listed properties associated with the property sellers and information for notifications sent to property buyers when offers are made in connection with listed properties the property buyers are watching; and a lender computing device associated with a lender user, said lender computing device comprising software that visually outputs a customized lender graphical user interface and lender tools for (i) receiving buyer offer notifications and requests for funding verification and (ii) uploading particular buyer funding verification associated with each particular buyer whose submitted offer for a listed property is pending acceptance.

3. The real estate transaction facilitation and incoming property offer notification system of claim 2, wherein the property buyers comprise (i) agent-represented property buyers associated with real estate agents of one or more brokerages and (ii) independent property buyers not associated with real estate agents of any brokerage.

4. The real estate transaction facilitation and incoming property offer notification system of claim 2, wherein the property sellers comprise (i) agent-represented property sellers associated with real estate agents of one or more brokerages and (ii) independent property sellers not associated with real estate agents of any brokerage.

5. The real estate transaction facilitation and incoming property offer notification system of claim 1, wherein the real estate agents associated with the brokerage comprise licensed real estate agents associated with the brokerage, wherein the property listing database stores all property listings submitted only by the licensed real estate agents associated with the brokerage.

* * * * *